United States Patent
Jakobsson et al.

(10) Patent No.: US 10,805,270 B2
(45) Date of Patent: Oct. 13, 2020

(54) MITIGATING COMMUNICATION RISK BY VERIFYING A SENDER OF A MESSAGE

(71) Applicant: Agari Data, Inc., San Mateo, CA (US)

(72) Inventors: Bjorn Markus Jakobsson, Portola Valley, CA (US); Theodore C. Loder, Durham, NC (US); Jacob R. Rideout, Raleigh, NC (US); Arthur Kwan Jakobsson, Portola Valley, CA (US); Michael L. Jones, Livermore, CA (US)

(73) Assignee: Agari Data, Inc., San Mateo, CA (US)

( * ) Notice: Subject to any disclaimer, the term of this patent is extended or adjusted under 35 U.S.C. 154(b) by 20 days.

(21) Appl. No.: 15/453,741

(22) Filed: Mar. 8, 2017

(65) Prior Publication Data

US 2018/0091478 A1    Mar. 29, 2018

Related U.S. Application Data

(60) Provisional application No. 62/399,821, filed on Sep. 26, 2016.

(51) Int. Cl.
*H04L 29/06* (2006.01)
*G06F 21/62* (2013.01)

(52) U.S. Cl.
CPC ...... *H04L 63/0263* (2013.01); *H04L 63/0245* (2013.01); *H04L 63/0254* (2013.01); *H04L 63/1433* (2013.01); *H04L 63/1483* (2013.01)

(58) Field of Classification Search
CPC ..... H04L 67/306; H04L 65/403; H04L 67/02; H04L 67/06; H04L 67/42; H04L 63/0263;

(Continued)

(56) References Cited

U.S. PATENT DOCUMENTS 6,073,142 A * 6/2000 Geiger ................ G06Q 10/107
                                                      709/204
6,161,130 A    12/2000 Horvitz
(Continued)

FOREIGN PATENT DOCUMENTS

JP    2011100489    5/2011
WO    2018213457   11/2018

OTHER PUBLICATIONS

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

(Continued)

*Primary Examiner* — Alexander Lagor
*Assistant Examiner* — Howard H. Louie
(74) *Attorney, Agent, or Firm* — Van Pelt, Yi & James LLP

(57) ABSTRACT

A first risk analysis of a message is performed. In the event the first risk analysis results in a determination that the message meets a first criteria, at least a portion of the message is modified prior to sending a modified version of the message to a specified recipient of the message, and a second risk analysis of the message is performed. The first risk analysis is performed before sending the modified version of the message and the modified version of the message is sent to the specified recipient of the message prior to a conclusion of the second risk analysis. In the event the second risk analysis results in a determination that the message meets a second criteria, content of the message that was previously prevented from being accessed by the specified recipient is provided to the specified recipient of the message.

14 Claims, 14 Drawing Sheets

(58) Field of Classification Search
CPC ............ H04L 63/0245; H04L 63/0254; H04L 63/1433; H04L 63/1483; H04L 29/06; G06F 21/62

See application file for complete search history.

(56) References Cited

U.S. PATENT DOCUMENTS

| | | |
|---|---|---|
| 6,574,658 B1 | 6/2003 | Gabber |
| 6,721,784 B1 | 4/2004 | Leonard |
| 7,293,063 B1 | 11/2007 | Sobel |
| 7,299,261 B1 | 11/2007 | Oliver |
| 7,644,274 B1 | 1/2010 | Jakobsson |
| 7,797,752 B1 | 9/2010 | Vaidya |
| 7,809,795 B1 | 10/2010 | Cooley |
| 7,809,796 B1* | 10/2010 | Bloch .................. G06Q 10/107 709/206 |
| 7,814,545 B2 | 10/2010 | Oliver |
| 7,831,522 B1 | 11/2010 | Satish |
| 7,899,213 B2 | 3/2011 | Otsuka |
| 7,899,866 B1* | 3/2011 | Buckingham ........... H04L 51/12 709/206 |
| 7,917,655 B1 | 3/2011 | Coomer |
| 7,941,842 B2 | 5/2011 | Prince |
| 8,010,614 B1 | 8/2011 | Musat |
| 8,131,655 B1 | 3/2012 | Cosoi |
| 8,255,572 B1 | 8/2012 | Coomer |
| 8,365,258 B2 | 1/2013 | Dispensa |
| 8,489,689 B1 | 7/2013 | Sharma |
| 8,560,962 B2 | 10/2013 | Wang |
| 8,566,938 B1 | 10/2013 | Prakash |
| 8,572,184 B1* | 10/2013 | Cosoi ...................... H04L 51/12 709/206 |
| 8,583,915 B1 | 11/2013 | Huang |
| 8,667,069 B1 | 3/2014 | Connelly |
| 8,667,074 B1* | 3/2014 | Farkas .................... H04L 51/12 709/206 |
| 8,676,155 B2* | 3/2014 | Fan ........................ H04W 4/12 455/406 |
| 8,719,940 B1 | 5/2014 | Higbee |
| 8,752,172 B1 | 6/2014 | Dotan |
| 8,832,202 B2 | 9/2014 | Yoshioka |
| 8,949,353 B1* | 2/2015 | Beguin .................. H04L 51/28 709/206 |
| 8,959,163 B1* | 2/2015 | Ledet ................ G06F 17/30699 709/206 |
| 8,984,640 B1 | 3/2015 | Emigh |
| 8,996,042 B1* | 3/2015 | Hannigan ............. H04W 68/04 455/458 |
| 9,009,829 B2 | 4/2015 | Stolfo |
| 9,060,057 B1 | 6/2015 | Danis |
| 9,154,514 B1 | 10/2015 | Prakash |
| 9,203,791 B1* | 12/2015 | Olomskiy ............... G06F 21/60 |
| 9,245,115 B1 | 1/2016 | Jakobsson |
| 9,258,314 B1 | 2/2016 | Xiao |
| 9,277,049 B1* | 3/2016 | Danis ................ H04M 3/42042 |
| 9,332,022 B1 | 5/2016 | Ashley |
| 9,338,287 B1 | 5/2016 | Russo |
| 9,471,714 B2 | 10/2016 | Iwasaki |
| 9,473,437 B1 | 10/2016 | Jakobsson |
| 9,560,506 B2* | 1/2017 | Gudlavenkatasiva .. H04W 4/90 |
| 9,613,341 B2 | 4/2017 | Shivakumar |
| 9,654,492 B2* | 5/2017 | Maylor ............... H04L 63/1433 |
| 9,781,149 B1 | 10/2017 | Himler |
| 9,800,589 B1 | 10/2017 | Asveren |
| 9,847,973 B1 | 12/2017 | Jakobsson |
| 9,906,554 B2 | 2/2018 | Higbee |
| 9,940,482 B1 | 4/2018 | Nichols |
| 10,122,715 B2 | 11/2018 | Dispensa |
| 2002/0138271 A1 | 9/2002 | Shaw |
| 2002/0184315 A1 | 12/2002 | Earnest |
| 2003/0009694 A1 | 1/2003 | Wenocur et al. |
| 2003/0023736 A1 | 1/2003 | Abkemeier |
| 2003/0225850 A1* | 12/2003 | Teague ................ G06Q 10/107 709/207 |
| 2003/0229672 A1 | 12/2003 | Kohn |
| 2003/0236845 A1 | 12/2003 | Pitsos |
| 2004/0073617 A1 | 4/2004 | Milliken |
| 2004/0148358 A1 | 7/2004 | Singh |
| 2004/0176072 A1* | 9/2004 | Gellens .................. H04L 51/12 455/412.1 |
| 2004/0177120 A1 | 9/2004 | Kirsch |
| 2004/0203589 A1 | 10/2004 | Wang |
| 2004/0215977 A1 | 10/2004 | Goodman |
| 2005/0033810 A1 | 2/2005 | Malcolm |
| 2005/0060643 A1 | 3/2005 | Glass |
| 2005/0076084 A1 | 4/2005 | Loughmiller |
| 2005/0076240 A1 | 4/2005 | Appleman |
| 2005/0080857 A1 | 4/2005 | Kirsch |
| 2005/0091320 A1 | 4/2005 | Kirsch |
| 2005/0097320 A1 | 5/2005 | Golan |
| 2005/0182735 A1 | 8/2005 | Zager |
| 2005/0188023 A1 | 8/2005 | Doan |
| 2005/0188045 A1* | 8/2005 | Katsikas ............... G06Q 10/107 709/206 |
| 2005/0198173 A1 | 9/2005 | Evans |
| 2005/0216587 A1 | 9/2005 | John |
| 2005/0223076 A1 | 10/2005 | Barrus |
| 2005/0235065 A1 | 10/2005 | Le |
| 2005/0257261 A1 | 11/2005 | Shraim |
| 2006/0004772 A1 | 1/2006 | Hagan |
| 2006/0015563 A1 | 1/2006 | Judge |
| 2006/0026242 A1 | 2/2006 | Kuhlmann |
| 2006/0031306 A1 | 2/2006 | Haverkos |
| 2006/0053279 A1 | 3/2006 | Coueignoux |
| 2006/0053490 A1 | 3/2006 | Herz |
| 2006/0085505 A1 | 4/2006 | Gillum |
| 2006/0101334 A1 | 5/2006 | Liao |
| 2006/0107323 A1 | 5/2006 | Mclean |
| 2006/0149821 A1 | 7/2006 | Rajan |
| 2006/0153380 A1 | 7/2006 | Gertner |
| 2006/0168024 A1 | 7/2006 | Mehr |
| 2006/0168329 A1 | 7/2006 | Tan |
| 2006/0195542 A1 | 8/2006 | Nandhra |
| 2006/0206713 A1 | 9/2006 | Hickman |
| 2006/0224677 A1 | 10/2006 | Ishikawa |
| 2006/0230461 A1 | 10/2006 | Hauser |
| 2006/0253597 A1* | 11/2006 | Mujica ................. G06Q 10/107 709/229 |
| 2006/0259558 A1 | 11/2006 | Yen |
| 2006/0265498 A1 | 11/2006 | Turgeman |
| 2007/0019235 A1 | 1/2007 | Lee |
| 2007/0027992 A1 | 2/2007 | Judge |
| 2007/0038718 A1 | 2/2007 | Khoo |
| 2007/0067465 A1 | 3/2007 | Blinn |
| 2007/0078936 A1 | 4/2007 | Quinlan |
| 2007/0086592 A1 | 4/2007 | Ellison |
| 2007/0100944 A1* | 5/2007 | Ford ..................... H04L 51/04 709/206 |
| 2007/0101423 A1 | 5/2007 | Oliver |
| 2007/0107053 A1 | 5/2007 | Shraim |
| 2007/0130618 A1 | 6/2007 | Chen |
| 2007/0136573 A1 | 6/2007 | Steinberg |
| 2007/0136806 A1 | 6/2007 | Berman |
| 2007/0143407 A1 | 6/2007 | Avritch |
| 2007/0143432 A1 | 6/2007 | Klos |
| 2007/0192169 A1 | 8/2007 | Herbrich |
| 2007/0198642 A1 | 8/2007 | Malik |
| 2007/0208850 A1 | 9/2007 | Lin |
| 2007/0214495 A1 | 9/2007 | Royer |
| 2007/0239639 A1 | 10/2007 | Loughmiller |
| 2007/0271343 A1 | 11/2007 | George |
| 2007/0276907 A1* | 11/2007 | Maes .................. H04M 7/0075 709/204 |
| 2007/0299916 A1 | 12/2007 | Bates |
| 2008/0004049 A1 | 1/2008 | Yigang |
| 2008/0022107 A1* | 1/2008 | Pickles .................. G06F 17/218 713/176 |
| 2008/0046970 A1 | 2/2008 | Oliver |
| 2008/0050014 A1 | 2/2008 | Bradski |
| 2008/0098237 A1 | 4/2008 | Dung |
| 2008/0104235 A1 | 5/2008 | Oliver |
| 2008/0141374 A1 | 6/2008 | Sidiroglou |
| 2008/0175266 A1 | 7/2008 | Alperovitch |

(56) References Cited

U.S. PATENT DOCUMENTS

| | | | |
|---|---|---|---|
| 2008/0178288 A1 | 7/2008 | Alperovitch | |
| 2008/0235794 A1 | 9/2008 | Bogner | |
| 2008/0276315 A1 | 11/2008 | Shuster | |
| 2008/0290154 A1 | 11/2008 | Barnhardt | |
| 2009/0037350 A1* | 2/2009 | Rudat | G06Q 10/107 706/11 |
| 2009/0064330 A1 | 3/2009 | Shraim | |
| 2009/0089859 A1 | 4/2009 | Cook | |
| 2009/0157708 A1 | 6/2009 | Bandini | |
| 2009/0210708 A1 | 8/2009 | Chou | |
| 2009/0228583 A1 | 9/2009 | Pocklington | |
| 2009/0252159 A1 | 10/2009 | Lawson | |
| 2009/0260064 A1 | 10/2009 | Mcdowell | |
| 2009/0292781 A1 | 11/2009 | Teng | |
| 2009/0319629 A1 | 12/2009 | De Guerre | |
| 2010/0030798 A1 | 2/2010 | Kumar | |
| 2010/0043071 A1 | 2/2010 | Wang | |
| 2010/0070761 A1 | 3/2010 | Gustave | |
| 2010/0082758 A1 | 4/2010 | Golan | |
| 2010/0094887 A1 | 4/2010 | Ye | |
| 2010/0115040 A1 | 5/2010 | Sargent | |
| 2010/0145900 A1 | 6/2010 | Zheng | |
| 2010/0198928 A1* | 8/2010 | Almeida | G06Q 10/107 709/206 |
| 2010/0235636 A1 | 9/2010 | Cohen | |
| 2010/0257222 A1* | 10/2010 | Hamilton, II | H04L 29/12066 709/202 |
| 2010/0287246 A1 | 11/2010 | Klos | |
| 2010/0299399 A1 | 11/2010 | Wanser | |
| 2010/0313253 A1 | 12/2010 | Reiss | |
| 2011/0061089 A1 | 3/2011 | O'Sullivan et al. | |
| 2011/0066687 A1* | 3/2011 | Chen | H04L 51/066 709/206 |
| 2011/0087485 A1 | 4/2011 | Maude | |
| 2011/0145152 A1* | 6/2011 | McCown | G06Q 20/02 705/67 |
| 2011/0191688 A1* | 8/2011 | Hasegawa | G06F 15/00 715/738 |
| 2011/0191847 A1 | 8/2011 | Davis | |
| 2011/0271349 A1* | 11/2011 | Kaplan | H04L 51/12 726/26 |
| 2011/0294478 A1* | 12/2011 | Trivi | H04M 3/436 455/415 |
| 2012/0030293 A1 | 2/2012 | Bobotek | |
| 2012/0136780 A1* | 5/2012 | El-Awady | G06Q 20/102 705/40 |
| 2012/0167233 A1 | 6/2012 | Gillum | |
| 2012/0192258 A1 | 7/2012 | Spencer | |
| 2012/0227104 A1 | 9/2012 | Sinha | |
| 2012/0242488 A1* | 9/2012 | Wilson | G08B 21/10 340/601 |
| 2012/0246725 A1 | 9/2012 | Osipkov | |
| 2012/0253810 A1 | 10/2012 | Sutton | |
| 2012/0278694 A1 | 11/2012 | Washio | |
| 2012/0311703 A1 | 12/2012 | Yanovsky | |
| 2013/0060905 A1 | 3/2013 | Mickens | |
| 2013/0067012 A1 | 3/2013 | Matzkel | |
| 2013/0081142 A1 | 3/2013 | Mcdougal | |
| 2013/0083129 A1 | 4/2013 | Thompson | |
| 2013/0104198 A1 | 4/2013 | Grim | |
| 2013/0128883 A1 | 5/2013 | Lawson | |
| 2013/0185775 A1 | 7/2013 | Dispensa | |
| 2013/0305318 A1 | 11/2013 | Deluca | |
| 2013/0318580 A1* | 11/2013 | Gudlavenkatasiva | G06F 21/31 726/7 |
| 2013/0346528 A1 | 12/2013 | Shinde | |
| 2014/0082726 A1* | 3/2014 | Dreller | G06Q 10/04 726/23 |
| 2014/0214895 A1* | 7/2014 | Higgins | G06F 16/3325 707/770 |
| 2014/0230061 A1 | 8/2014 | Higbee | |
| 2014/0245396 A1 | 8/2014 | Oberheide | |
| 2014/0250506 A1 | 9/2014 | Hallam-Baker | |
| 2014/0258420 A1* | 9/2014 | Dent | H04L 51/14 709/206 |
| 2014/0259158 A1 | 9/2014 | Brown | |
| 2014/0340822 A1* | 11/2014 | Lal | H02H 7/0822 361/652 |
| 2014/0366144 A1 | 12/2014 | Alperovitch | |
| 2015/0030156 A1 | 1/2015 | Perez | |
| 2015/0033343 A1* | 1/2015 | Jiang | H04L 63/1441 726/23 |
| 2015/0067833 A1 | 3/2015 | Verma | |
| 2015/0081722 A1 | 3/2015 | Terada | |
| 2015/0100896 A1* | 4/2015 | Shmarovoz | H04L 51/22 715/752 |
| 2015/0113627 A1 | 4/2015 | Curtis | |
| 2015/0148006 A1* | 5/2015 | Skudlark | H04W 4/12 455/26.1 |
| 2015/0156154 A1 | 6/2015 | Russell | |
| 2015/0172233 A1* | 6/2015 | She | H04L 51/22 709/206 |
| 2015/0216413 A1* | 8/2015 | Soyao | A61B 5/0022 709/204 |
| 2015/0236990 A1* | 8/2015 | Shan | H04L 51/046 709/206 |
| 2015/0288714 A1 | 10/2015 | Emigh | |
| 2015/0326510 A1* | 11/2015 | Tomlinson | H04L 51/04 709/206 |
| 2015/0334065 A1* | 11/2015 | Yan | H04W 4/21 709/206 |
| 2015/0363839 A1* | 12/2015 | Zolty | G06Q 30/0279 705/39 |
| 2015/0371212 A1* | 12/2015 | Giordano | G06Q 20/32 705/44 |
| 2015/0381653 A1 | 12/2015 | Starink | |
| 2016/0014151 A1 | 1/2016 | Prakash | |
| 2016/0037270 A1* | 2/2016 | Polinske | H04R 25/554 381/315 |
| 2016/0087925 A1* | 3/2016 | Kalavagattu | H04L 51/066 709/206 |
| 2016/0094566 A1* | 3/2016 | Parekh | H04L 63/0414 726/1 |
| 2016/0104132 A1 | 4/2016 | Abbatiello | |
| 2016/0210662 A1* | 7/2016 | Duggal | G06Q 30/0251 |
| 2016/0225897 A1 | 8/2016 | Sridhar | |
| 2016/0269437 A1 | 9/2016 | Mcdougal | |
| 2016/0277485 A1* | 9/2016 | Abrams | G06F 17/30867 |
| 2016/0352840 A1* | 12/2016 | Negron | H04L 67/16 |
| 2016/0359790 A1* | 12/2016 | Zhang | H04L 51/32 |
| 2017/0005961 A1 | 1/2017 | Liebmann | |
| 2017/0078321 A1 | 3/2017 | Maylor | |
| 2017/0085584 A1 | 3/2017 | Goutal | |
| 2017/0091274 A1 | 3/2017 | Guo | |
| 2017/0195310 A1* | 7/2017 | Tyler | H04L 63/083 |
| 2017/0206545 A1* | 7/2017 | Gupta | G06Q 30/0226 |
| 2017/0251006 A1 | 8/2017 | Larosa | |
| 2017/0324767 A1 | 11/2017 | Srivastava | |
| 2017/0331816 A1 | 11/2017 | Votaw | |
| 2017/0331824 A1 | 11/2017 | Pender | |
| 2018/0160387 A1 | 6/2018 | Chastain | |
| 2018/0184289 A1 | 6/2018 | Dudley | |
| 2020/0067861 A1 | 2/2020 | Leddy | |

OTHER PUBLICATIONS

Author Unknown, "Babastik: AntiSpam Personal", downloaded from "https://web.archive.org/web/20101031061734/babastik.com/AntiSpam-Personal/", Oct. 31, 2010.

Author Unknown, "bluebottle—trusted delivery", downloaded from "https://web.archive.org/web/20140715223712/https://bluebottle.com/trusted-delivery.php", Jul. 15, 2014.

Author Unknown, "Federal Court Denies Attempt By Mailblocks, Inc. To Shut Down Spamarrest LLC", downloaded from "http://www.spamarrest.com/pr/releases/20030611.jsp", Seattle, WA, Jun. 11, 2003.

Author Unknown, "First of all, Your Software Is Excellent", downloaded from "https://web.archive.org/web/20120182074130/http://www.spamresearchcenter.com/", Aug. 12, 2012.

(56) References Cited

OTHER PUBLICATIONS

Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software.html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, Captcha: Telling Humans and Computers Apart Automatically, downloaded from "https://web.archive.org/web/20160124075223/http:/www.captcha.net/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.
Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.
Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/products/how-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.
Author Unknown, Kens Spam Filter 1.40, downloaded from "https://web.archive.org/web/20080317184558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/securer/", Nov. 9, 2013.
Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:60/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, PermitMail, Products: The most advanced email firewall available for your business, downloaded from "https://web.archive.org/web/20160219151855/http://ipermitmail.com/products/", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge And Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http:/smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.
Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, SPAM Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.

(56) References Cited

OTHER PUBLICATIONS

Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.
Author Unknown, SPAMjadoo: Ultimate Spam Protection, downloaded from "https://web.archive.org/web/20140512000636/http:/www.spamjadoo.com:80/esp-explained.htm" May 12, 2014.
Author Unknown, SpamKilling, "What is AntiSpam?", downloaded from "https://web.archive.org/web/20100411141933/http:/www.spamkilling.com:80/home_html.htm", Apr. 11, 2010.
Author Unknown, SpamRestraint.com: How does it work?, downloaded from "https://web.archive.org/web/20050206071926/http://www.spamrestraint.com:80/moreinfo.html", Feb. 6, 2005.
Author Unknown, Tagged Message Delivery Agent (TMDA), downloaded from "http://web.archive.org/web/20160122072207/http://www.tmda.net/", Jan. 22, 2016.
Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.
Author Unknown, V@nquishLabs, How it Works: Features, downloaded from "https://web.archive.org/web/20081015072416/http://vanquish.com/features/features_how_it_works.shtml", Oct. 15, 2008.
Author Unknown, What is Auto Spam Killer, downloaded from "https://web.archive.org./web/20090215025157/http://knockmail.com:80/support/descriptionask.html", Feb. 15, 2009.
Author Unknown, White List Email (WLE), downloaded from "https://web.archive.org/web/20150912154811/http:/www.rfc1149.net/devel/wle.html", Sep. 12, 2015.
Bjorn Markus Jakobsson, U.S. Appl. No. 14/487,989 entitled "Detecting Phishing Attempts" filed Sep. 16, 2014.
Brad Templeton, "Proper principles for Challenge/Response anti-spam systems", downloaded from "http://web.archive.org/web/2015090608593/http://www.templetons.com/brad/spam/challengeresponse.html", Sep. 6, 2015.
Danny Sleator, "Blowback: A Spam Blocking System", downlaoded from "https://web.archive.org/web/20150910031444/http://www.cs.cmu.edu/~sleator/blowback", Sep. 10, 2015.
David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.
Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.
Ronald L. Rivest, "RSF Quickstart Guide", Sep. 1, 2004.
James Thornton, "Challenge/Response at the SMTP Level", downloaded from "https://web.archive.org/web/20140215111642/http://original.jamesthornton.com/writing/challenge-response-at-smtp-level.html", Feb. 15, 2014.
Karsten M. Self, "Challenge-Response Anti-Spam Systems Considered Harmful", downloaded from "ftp://linuxmafia.com/faq/Mail/challenge-response.html", last updated Dec. 29, 2003.
Marco Paganini, Active Spam Killer, "How It Works", downloaded from "https://web.archive.org/web/20150616133020/http:/a-s-k.sourceforge.net:80/howitworks.html", Jun. 16, 2015.
Peter Simons, "mapSoN 3.x User's Manual", downloaded from "https://web.archive.org/web/20140626054320/http:/mapson.sourceforge.net/", Jun. 26, 2014.
A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.
Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.
Bjorn Markus Jakobsson, U.S. Appl. No. 14/535,064 entitled "Validating Automatic Number Identification Data" filed Nov. 6, 2014.
Bjorn Markus Jakobsson, U.S. Appl. No. 15/235,058 entitled "Tertiary Classification of Communications", filed Aug. 11, 2016.
Bjorn Markus Jakobsson, U.S. Appl. No. 15/414,489, entitled "Detection of Business Email Compromise", filed Jan. 24, 2017.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.
M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.
NIST. Usability of Security. http://csrc.nist.gov/security-usability/HTML/research.html.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.
Entrust: "Strong Multifactor Authentication Methods from Entrust IdentityGuard," https://web.archive.org/web/20110825101942/http://www.entrust.com/strong-authentication/authenticators.htm. Aug. 25, 2011.
Entrust: Mobile Authentication and Transaction Verification1,2,3, https://web.archive.org/web/20110814071521/http://www.entrust.com/mobile-security. Aug. 14, 2011.
Entrust: Proven Transaction Verification on Smartphones & Mobile Devices—Entrust,https://web.archive.org/web/20110918231205/http://www.entrust.com/transaction-verification/index.htm. Sep. 18, 2011.
Entrust: WP_Securing_Whats_At_Risk_Jul. 8, https://web.archive.org/web/20110809104408/http://download.entrust.com/resources/download.cfm/22313/. Aug. 9, 2011.
ESphinx: "Cyota launches new authentication platform for online banking," https://web.archive.org/web/20050508152420/http://www.cyota.com/news.asp?id=173. May 8, 2005.
ESphinx: "Cyota and Quova Reducing Online Fraud with Cyota's eVision Technology," https://web.archive.org/web/20060307092523/http://www.cyota.com/press-releases.asp?id=81. Mar. 7, 2006.
ESphinx: "Cyota eSphinx," https://web.archive.org/web/20051214102438/http://www.cyota.com/product_7.asp. Dec. 14, 2020.
ESphinx: Cyota releases eSphinx online authentication package, https://web.archive.org/web/20050508152435/http://www.cyota.com/news.asp?id=170. May 8, 2005.
ESphinx: "How Does it Work?"; https://web.archive.org/web/20051210112946/http://www.cyota.com/product_7_19.asp. Dec. 10, 2005.

(56) References Cited

OTHER PUBLICATIONS

ESphinx: "Key Features," https://web.archive.org/web/20051210114904/http://www.cyota.com/product_7_18.asp. Dec. 10, 2005.

Green Armor: Dec. 8, 2005 Press Release: "Green Armor Solutions™ Introduces Identity Cues Two Factor™"; http://www.greenarmor.com/Green_Armor_Solutions_News-2005-12-07.shtml.

Green Armor: Green Armor Solutions "Identity Cues Products"; https://web.archive.org/web/20060110032814/http://www.greenarmor.com/products.shtml. Jan. 10, 2006.

Green Armor: Green Armor Solutions "Identity Cues Two Factor™ & Two Way Authentication"; https://web.archive.org/web/20060209211113/http:/www.greenarmor.com/DataSheets/Identity%20Cues%20Two%20Factor%20Data%20Sheet.pdf. Feb. 9, 2006.

Kim et al., Context Information-based application access central model, IMCOM '16: Proceedings of the 10th International Conference on Ubiquitous Information Management and Communication. Jan. 2016, Article No. 75, pp. 1-5 (Year: 2016).

Robinson et al., Caching Context Information in Persvasive System, MDS '06: Proceedings of the 3rd International Middleware doctoral Symposium. Nov. 2006, pp. 1 (Year 2006).

RSA 7035_CONPRO_SB_0711: "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.

RSA 9697_AATF_SB_0808: "RSA Adaptive Authentication overview solution brief"; https://web.archive.org/web/20101225124323/http://www.rsa.com/products/consumer/sb/9697_AATF_SB_0808.pdf. Dec. 25, 2010.

RSA AAAM_SB_0208: "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.

Toopher: https://web.archive.org/web/20120430105502/http://toopher.com/. Apr. 30, 2012.

Toopher: Toopher Developer Documentation; https://web.archive.org/web/20120523192419/https://www.toopher.com/developers.html. May 23, 2012.

U.S. Appl. No. 61/551,370, filed Oct. 25, 2011.

Binkley et al., "Improving identifier informativeness using part of speech information", MSR '11: Proceedings of the 8th Working Conference on Mining Software Repositories. May 2011, pp. 203-206. (Year: 2011).

Heinermann et al., "Recommending API methods based on identifier contexts", Suite '11: Proceedings of the 3rd International Workshop on Search-Driven Development: Users, Infrastructure, Tools, and Evaluation. May 2011, pp. 1-4. (Year: 2011).

Laszka et al., "Integrity assurance in resource-bounded systems through stochastic message authentication", HotSoS '15: Proceedings of the 2015 Symposium and Bootcamp on the Science of security. Apr. 2015, Article No. 1, pp. 1-12. https://doi.org/ (Year: 2015).

Peterson et al. "Authenticated Identity Management in the Session Initiation Protocol (SIP)". Jul. 15, 2013. https://www.ietf.org/archive/id/draft-jennings-dispatch-rfc4474bis-01.txt.

Peterson et al. "Authenticated Identity Management in the Session Initiation Protocol (SIP)". May 29, 2013. https://datatracker.ietf.org/doc/draft-jennings-dispatch-rfc4474bis/00/.

* cited by examiner

Patrick Peterson <ppeterson909@yahoo.com>
To: Markus Jakobsson <mjakobsson@agari.com>
need your help This message was flagged. Before you can respond to it, you need to classify it. Click to select:

This email is from

- ⊙ a colleague
- ⊙ a company I do business with
- ⊙ a friend or acquaintance
- ⊙ a stranger ―――Original message sent by ppeterson909@yahoo.com:―――

Hi Markus,

Are you at your desk? I need to talk to you.

Cheers,
Pat

Portions of the email may be obfuscated, and any web-links disabled. Classify the message to get full access.
Why was this message flagged?

Markus Jakobsson <mjakobsson@agari.com>  Today at 1:50 PM  (MJ)
To: ppeterson909@yahoo.com
Reply-To: noreply@agari,com
Automated response - your message has been quarantined Hi Patrick Peterson, You recently sent a message to Markus Jakobsson <mjakobsson@agari.com>. The message has been placed in quarantine.

It is possible that you normally communicate with Markus jakobsson <mjakobsson@agari.com> using another email address that is whitelisted by the security system.
If you think that is so, then here is what you must do to also whitelist your email address ppeterson909@yahoo.com:

1. Forward this message in its entirety to the email address you normally use to communicate with Markus Jakobsson <mjakobsson@agari.com>.
2. Log in to that email account, find your forwarded message, and forward it again to whitelist@agari.com from that account.
3. You will then receive a confirmation email, and your message will be removed from quarantine and delivered.
4. You will only have to do this once for this email account, and not for each email you send.

Thanks, and have a good day!
The Agari Team

Security code GF686L88.

FIG. 9B

MITIGATING COMMUNICATION RISK BY VERIFYING A SENDER OF A MESSAGE

CROSS REFERENCE TO OTHER APPLICATIONS

This application claims priority to U.S. Provisional Patent Application No. 62/399,821 entitled MITIGATING COMMUNICATION RISK filed Sep. 26, 2016 which is incorporated herein by reference for all purposes.

BACKGROUND OF THE INVENTION

Deception is rapidly on the rise on the Internet, and email is the attack vector of choice for a broad array of attacks, including ransomware distribution, enterprise-facing cons, and mass-deployed phishing attacks. It is widely believed that this is due to the ubiquity of email and the limited extent to which relevant email security measures have been rolled out. One of the most troubling types of attack is the targeted attack, in which the attacker poses as somebody the intended victim knows.

There are three common ways used by attackers to masquerade as somebody trusted: spoofing, look-alike domain attacks, and display name attacks (collectively referred as impersonation attacks). In a spoofing attack, an email is injected in the mail stream (commonly at an open relay controlled by the adversary) with manipulated headers indicating that the email was sent by a party known to the recipient. Look-alike domain attacks (also referred to as cousin-name attacks) involve the attackers registering deceptive domains and sending emails from these. An example look-alike domain is bankofarnerica.com (notice the use of "rn" instead of "m" in the name). In a display name attack, the adversary simply sets the display name of an account he controls (commonly a throw-away webmail account) to match the display name of the party the attacker wishes to impersonate. To make it concrete, a typical email of this type may be sent from "Bank of America <janeroe104@gmail.com>", where the display name is "Bank of America" and the associated email address is <janeroe104@gmail.com>. Since the display name is commonly the only indication of the identity of the sender that is displayed to the recipient (and almost always the only one that the recipient pays attention to), this attack is very effective.

Therefore, there exists a need for effective ways to detect and handle impersonation attacks.

BRIEF DESCRIPTION OF THE DRAWINGS

Various embodiments of the invention are disclosed in the following detailed description and the accompanying drawings.

FIG. 8B shows an example of a modified message requesting manual classification of the sender of the message.

FIG. 9B shows an example of an automatic reply message requesting verification of an identity of the sender of the message.

DETAILED DESCRIPTION

Figure 1:
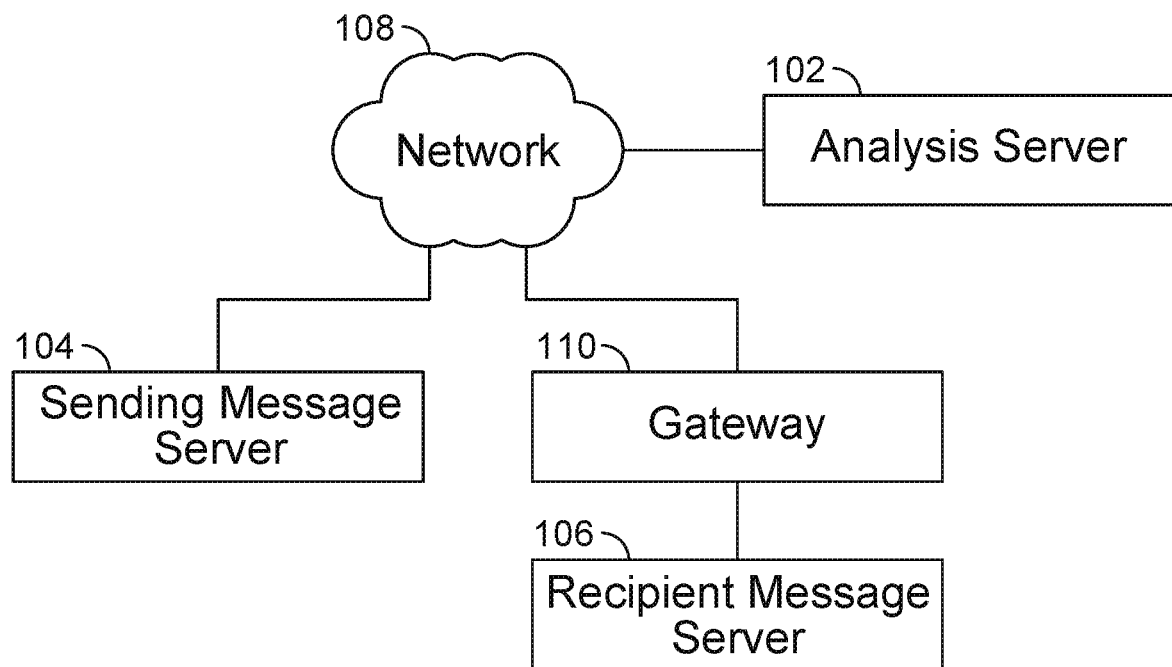
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing received messages is disclosed. For example, the message is an email message received for delivery to a recipient and the message is to be analyzed to detect whether the message is suspicious and is a part of an impersonation attack. The message may be suspicious due to content of the message (e.g., malware email attachment, includes a link to a phishing website, etc.) and/or a sender of the message (e.g., display name of the sender does not match sender email address).

In some embodiments, a measure of similarity between a sender identifier of the message and each identifier of each trusted contact of a plurality of trusted contacts of a recipient of the message is determined. For example, a list of trusted contacts of a recipient of the message is maintained by a system analyzing risk of incoming messages. This system may track trusted contacts of members of an organization (e.g., for each email user of a domain) for each member individually and/or together as a group. The list of trusted contacts may be at least in part specified by a user. For example, the user provided the system access to an address book of the user. In some embodiments, at least a portion of the trusted contacts is determined automatically. For example, based on observed recipients and senders of message traffic received and sent by the user, at least a portion of the trusted contacts is generated automatically. By determining the measure of similarity, a risk of likelihood of confusion by the message recipient that the message is from a trusted contact of the user is able to be determined. An example of the measure of similarity is a string distance between an email address or a display name of the sender of the message and an email address or an associated display name of a trusted contact.

In the event the sender of the message is not any of the trusted contacts but at least one of the measures of similarity meets a threshold, the message is filtered, if applicable. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack. Filtering the message may include blocking the message, quarantining the message, further analyzing the message, and/or modifying the message to alter a data field of the message including an identification of the sender of the message (e.g., modify to insert a warning).

In some embodiments, in response to a determination that the message is suspicious (e.g., first risk analysis results in a determination that the message meets a first criteria), additional risk analysis is performed (e.g., perform a second risk analysis). For example, if the message is suspicious, at least a portion of the message is modified prior to sending a modified version of the message to a specified recipient of the message and a second risk analysis of the message is performed. The analysis of determining that the message is suspicious (e.g., first risk analysis) is performed before sending the modified version of the message and the modified version of the message is sent to the specified recipient of the message prior to a conclusion of the second risk analysis. For example, the modified version of the message is sent and delivered to a server mailbox of the specified recipient of the message prior to the conclusion of the second risk analysis.

In some embodiments, a recipient of the message is sent an inquiry requesting the recipient to verify which sender is believed to have sent the message prior to allowing full access to the message (e.g., ask recipient if the email address and/or display name of the message is someone that the recipient knows). In the event the second risk analysis results in a determination that the message meets a second criteria, the specified recipient of the message is provided content of the message that was previously prevented from being accessed by the specified recipient.

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is the last server that handled a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and filters it for potentially harmful or undesired messages. For example, incoming messages are filtered and analyzed for spam, viruses, spoofing, impersonation, and any other harmful or undesired content to detect, prevent, or minimize such messages from reaching a message recipient served by the recipient message server. In some embodiments, analysis server 102 determines and/or maintains a list of trusted contacts for one or more users (e.g., user accounts) of recipient message server 106. For example, by obtaining an address book from a user and/or observing message traffic to and from server 106 of the user, server 102 determines and/or maintains a list for each user.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message in the event a potential threat is detected. In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

In some embodiments, recipient message server 106 performs a risk analysis for an incoming message at least in part by performing an authenticity and/or reputation analysis to determine an overall measure of risk (e.g., risk score). Performing authenticity analysis may include determining a measure of confidence that a sender identified in the message (e.g., domain of sender) is the actual sender of the message. Performing reputation analysis may include determining a measure that an identified sender of the email (e.g., domain of sender) is likely to send a message that is of value to a recipient (e.g., likelihood of sending message that a recipient would want/desire to receive).

In some embodiments, determining authenticity of a message includes utilizing sender profiles that link an identifier of a sender to one or more IP addresses of servers determined to be associated with the sender. These sender profiles may be determined by analysis server 102 and/or the determined results are accessed by recipient message server 106 from analysis server 102 via network 108. For example, analysis server 102 is in communication with a plurality of different recipient message servers and analysis server 102 at least in part automatically determines associations between sender identifiers (e.g., network/Internet domain, email address, etc.) and IP addresses by analyzing messages that have been received at one or more recipient message servers. In some embodiments, a sender model of a sender may be specifically determined for a particular recipient (e.g., specific for all recipients of a particular domain, particular for an individual recipient, etc.). For example, a sender may only utilize a specific server with a first IP address for one group of recipients (e.g., recipients geographically located in North America) while another server with a second IP address is only utilized for another group of recipients (e.g., recipients geographically located in Asia).

In some embodiments, determining a reputation of a sender of a message includes utilizing a predetermined database of senders and their associated reputations. The reputations of senders may be determined by analysis server 102 and/or the determined reputations are accessed by recipient message server 106 from analysis server 102 via network 108. For example, analysis server 102 is in communication with a plurality of different recipient message servers and the analysis server 102 at least in part automatically determines a reputation score for a sender (e.g., network/Internet domain, email address, etc.) at least in part by using machine learning to analyze messages from the sender that have been received at one or more recipient message servers. In some embodiments, a reputation of a sender may be specifically determined for each particular message recipient (e.g., specific for all recipients of a particular domain, particular for an individual recipient, etc.). For example, a measure of reputation for a sender may be different for each different message recipient based on whether the recipient has had a prior communication relationship with the sender.

In some embodiments, the risk analysis performed by recipient message server 106 results in a risk value corresponding to the combination of the authenticity and reputation measures of the message. The risk value may be utilized at least in part to flag/label the message and/or to determine whether to allow the message to be delivered to an intended recipient of the message.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
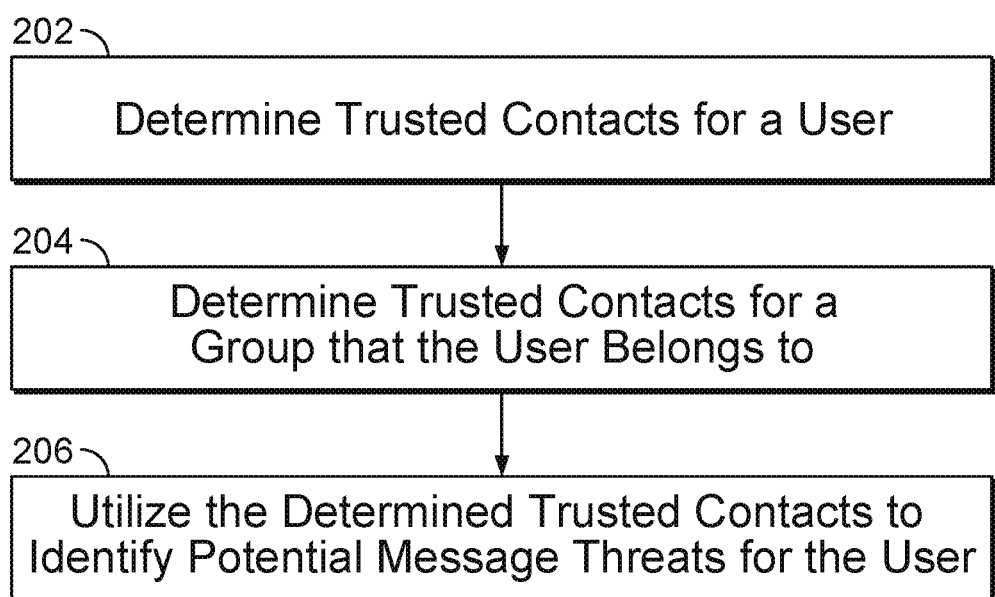
FIG. 2 is a flowchart illustrating an embodiment of a process for tracking trusted contacts.

FIG. 2 is a flowchart illustrating an embodiment of a process for tracking trusted contacts. The process of FIG. 2 may be at least in part performed by analysis server 102, gateway 110 and/or message server 106 of FIG. 1. Examples of the contacts include email addresses, usernames, display names, user identifiers, an identification photo, and any other identifier that may be utilized to identify a sender or recipient of a message.

At 202, trusted contacts for a user are determined. The trusted contacts are to be utilized to identify potential message threats of the user. The trusted contacts identify one or more contacts (e.g., senders or recipients of messages) that are familiar to the user because the user has previously interacted with the contact and/or is aware of the contact. In some embodiments, determining the trusted contacts includes receiving a list of contacts for the user. For example, the user provides access to an address book of the user and information about contacts in the address book is received. In some embodiments, the trusted contacts include contacts that have been specifically identified by the user. In some embodiments, information about the trusted contacts is stored. For example, the trusted contacts for the user are stored in a database of trusted contacts. This database may track trusted contacts for a plurality of different users and allows trusted contacts to be retrieved for a specific identified user. The stored information of each contact may include one or more of the following: email address, associated name (e.g., display name), relationship identifier, identifying image (e.g., contact photo), username, instant message identifier, address, phone number, a measure of trust, a measure of message interaction, and any other identifier utilized to identify a sender or a receiver of a message.

In some embodiments, the trusted contacts for the user are at least in part determined automatically based on contacts detected in messages sent or received by the user. For example, by observing and analyzing message traffic of the user and patterns of message recipients and senders, contacts that receive messages from the user and contacts that send messages to the user can be determined and correlated to infer and determine trust, frequency, and/or importance of interaction and relationship between the user and the contact to identify one or more of these contacts as a trusted contact. In one example, if a threshold number of messages has been sent to and from a contact for a user, the contact is identified as a trusted contact and added to a stored list of trusted contacts for the user. Information about the messages of the user utilized to at least in part automatically determine the trusted contacts has been obtained for analysis by receiving at least a portion of the messages (e.g., a copy of the entire message, email addresses and names of contacts of messages, etc.) for analysis (e.g., at server 102 from server 104, gateway 110, or server 106 of FIG. 1).

At 204, trusted contacts for a group that the user belongs to are determined. For example, trusted contacts for the users included in the group are aggregated to identify patterns among the aggregated trusted contacts. Examples of the group include a network domain that the user belongs to (e.g., domain of the email address of the user), an entity/organization that the user belongs to (e.g., company that the user belongs to), a message service provider, or an authority that controls a message account of the user. In some embodiments, determining trusted contacts for the group includes aggregating information about a trusted contact and/or a network domain of one or more trusted contacts from information gathered for different users for the trusted contact and/or the network domain. In some embodiments, determining the trusted contacts for the group includes storing information about the trusted contacts in a data storage structure and associating this stored information with the group.

At 206, determined trusted contacts are utilized to identify potential message threats for the user. For example, the contacts in the trusted contacts may be utilized as a proxy for contacts that are familiar to the user and if an attacker tries to attack the user using an impersonation attack, contact being impersonated likely corresponds to one of the contacts in the list of trusted contacts of the user. By determining a measure of similarity between a sender identifier of a message received for the user with each identifier of each trusted contact, messages attempting impersonation attacks may be identified. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack and filtered. Filtering the message may include blocking the message, quarantining the message, further analyzing the message, and/or modifying the message (e.g., insert a warning).

Figure 3:
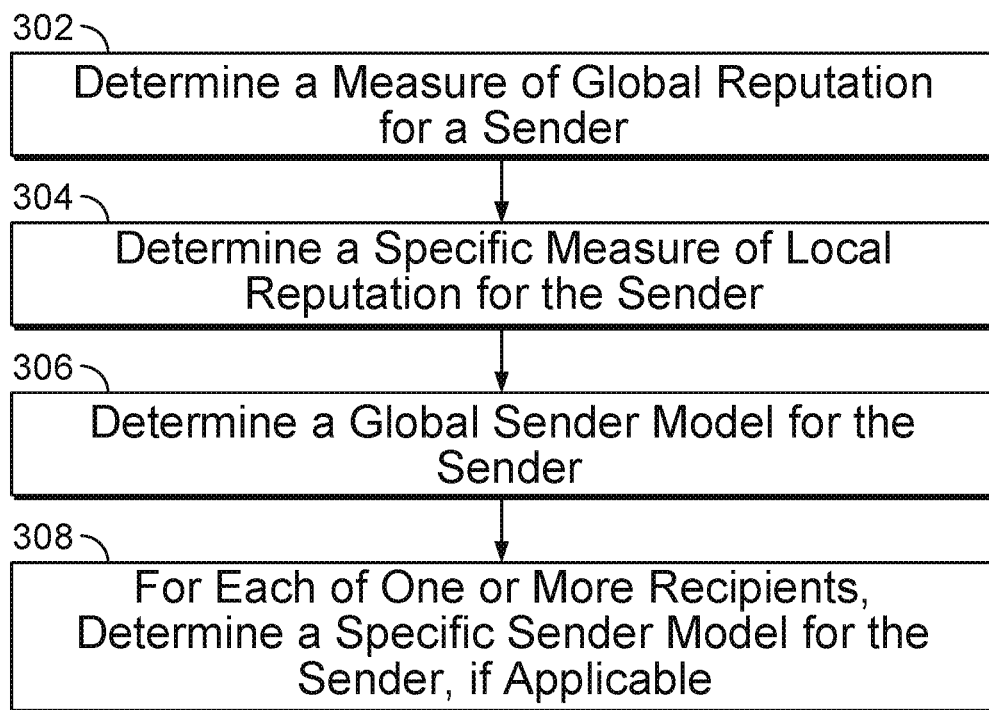
FIG. 3 is a flowchart illustrating an embodiment of a process for determining information about a message sender to be utilized to assess a risk of a message.

FIG. 3 is a flowchart illustrating an embodiment of a process for determining information about a message sender to be utilized to assess a risk of a message. The process of FIG. 3 may be at least in part implemented on analysis server 102, gateway 110 and/or message server 106 of FIG. 1. In some embodiments, at least a portion of the process of FIG. 3 is performed in 202 and/or 204 of FIG. 2. For example, the process of FIG. 3 may be repeated for each trusted contact determined for a user (e.g., for each contact in a list of trusted contacts stored in a repository) and stored in a data structure that tracks the trusted contacts. The process of FIG. 3 may be repeated periodically.

At 302, a measure of global reputation for a sender is determined. The sender may correspond to a group of individual sender addresses in some embodiments or an individual sender address in other embodiments. For example, the sender corresponds to a trusted contact in a list of trusted contacts determined using the process of FIG. 2. In another example, the sender corresponds to a domain of a trusted contact identified using the process of FIG. 2. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 304) for the sender determined for each recipient of a group of different recipients to determine a combined measure (e.g., combined score).

At 304, a specific measure of local reputation for the sender is determined for each of one or more different recipients. For example, although the measure of global reputation determined in 302 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 202 of the process of FIG. 2. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 306, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 308, a specific sender model for the sender is determined for each of one or more recipients, if applicable. For example, although the sender model determined in 306 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 306 except for utilizing data specific to the recipient rather than various different recipients. For example, using a repository storing messages received from the sender to only the recipient, individual or neighborhoods of IP addresses associated with the sender model for a sender are automatically determined.

Figure 4:
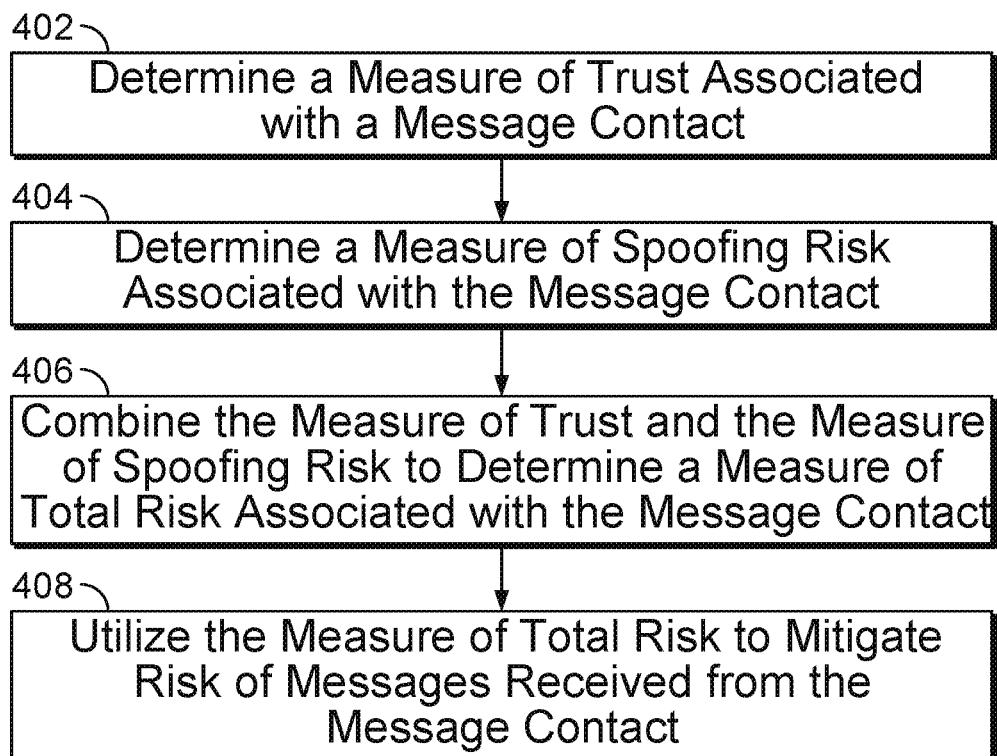
FIG. 4 is a flowchart illustrating an embodiment of a process for determining a total risk measure of a contact.

FIG. 4 is a flowchart illustrating an embodiment of a process for determining a total risk measure of a contact. The process of FIG. 4 may be at least in part implemented on analysis server 102, gateway 110 and/or message server 106 of FIG. 1.

At 402, a measure of trust associated with a message contact is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 3. For example, the measure of trust is the specific measure of local reputation determined in 304. In another example, the measure of trust is the measure of global reputation included in the global sender model determined in 306. In another example, the measure of trust is determined based on a combination (e.g., average, sum, product, etc.) of the measure of global reputation and the specific measure of local reputation.

At 404, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 406, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 408, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Figure 5:
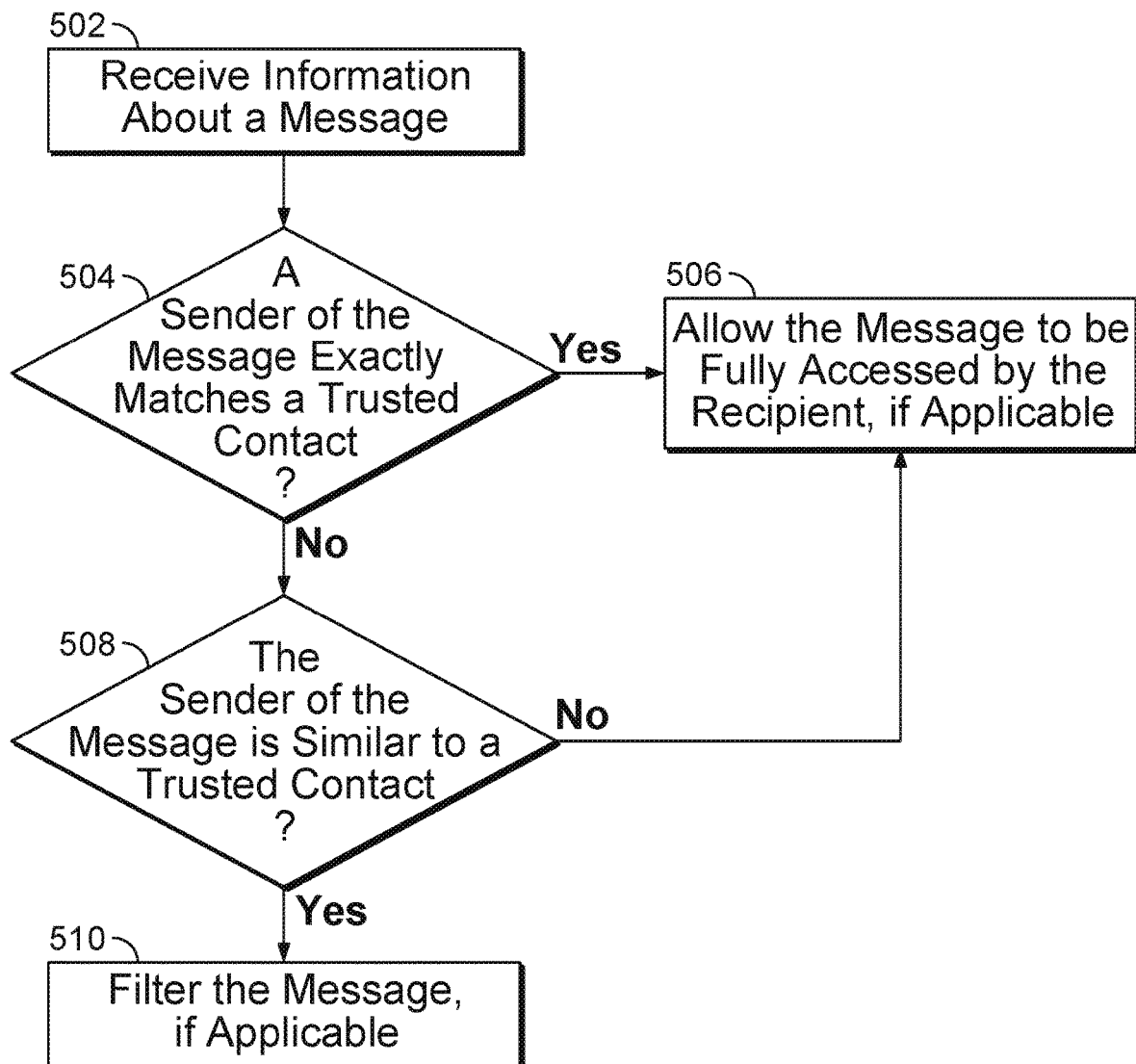
FIG. 5 is a flowchart illustrating an embodiment of a process for assessing a received message for filtering.

FIG. 5 is a flowchart illustrating an embodiment of a process for assessing a received message for filtering. The process of FIG. 5 may be at least in part implemented on analysis server 102, gateway 110 and/or message server 106 of FIG. 1.

At 502, information about a message is received. In some embodiments, the information is received at analysis server 102 of FIG. 1. The information may include information about a sender of the message. For example, the information includes email address header information including an email address and a display name of the sender of the message. In some embodiments, the information about the message includes contents of the message. Examples of the message include an electronic mail (i.e., email), an instant message, a chat message, and any other forms of electronic messages.

At 504, it is determined whether a sender of the message exactly matches a trusted contact. For example, it is determined whether an address of the sender of the message (e.g., in a "From:" field of a message header) exactly matches an address of a trusted contact in a list of trusted contacts for the recipient of the message. In some embodiments, the trusted contacts include trusted contacts identified in 202 and/or 204 of FIG. 2. For example, a list of trusted contacts for the recipient of the message is obtained from storage and email addresses for each trusted contact of the list are compared with the email address of a sender of the message to identify whether there is an exact match.

If at 504 it is determined that the sender of the message exactly matches the trusted contact, at 506, the message is allowed to be fully accessed by the recipient, if applicable. For example, because the sender of the message exactly matches the trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware. In some embodiments, the total risk score determined using 406 of FIG. 4 is utilized to determine whether to allow full access to the message. If a value of the measure of total risk of the sender is above a threshold value, the message is identified as a risk and the message is filtered as in 510 to reduce its risk to the recipient.

If at 504 it is determined that the sender of the message does not exactly match a trusted contact, at 508, it is determined whether the sender of the message is similar to a trusted contact. For example, by determining whether the sender of the message is similar to a trusted contact, a likelihood of confusion by a recipient of the message that the message is from a trusted contact is determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 202 and/or 204 of FIG. 2. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

In some embodiments, it is determined that the sender of the message is similar to a trusted contact if any measure of similarity (e.g., string distance measure) meets a threshold value. For example, if any string distance measure determined for a list of trusted contacts is greater than a threshold value, the message is identified as potentially an impersonation attack message and it is determined that the sender of the message is similar to the trusted contact.

In some embodiments, messages that are highly authentic (e.g., associated with a valid DMARC signature, correct SPF records, or both) but which come from domains that are associated with low control are to be subject to increased analysis. For example, a measure of control of the domain of the sender is determined. The measure of control measures how easy it is to create an account of the domain without having to pass a careful screening. For example, any user is able to create a Google Gmail account by setting the username to any available user name and setting the display name to any correctly formed display name. Thus, domains correspond to a very low degree of control by the domain owner. In contrast, the typical enterprise or government entity has high control over account creation, allowing only employees and affiliates to create accounts, where these have to satisfy some common criteria related to the real-life identity of the user. When the message is identified as having high authenticity but low domain control, then the display name is to be scrutinized (e.g., compared to trusted display names using string distance as previously discussed), whereas for domains with high control, the display name is not scrutinized (e.g., display name impersonation detection not performed).

If at 508 it is determined that the sender of the message is similar to a trusted contact, at 510, the message is filtered, if applicable. Filtering the message may include modifying at least a portion of the message, affecting delivery of the message, providing a notification regarding the message, and/or performing additional analysis on the message. An example of filtering the message is performing a security action.

In some embodiments, modifying at least a portion of the message includes modifying (e.g., replacing, adding or removing/deleting) data included in a data field (of the message) that includes an identification of the sender of the message. For example, the data field that is identified to include the identification of the sender is selected from a plurality of data fields of a message header and contents of the selected data field is modified. Examples of the identification of the sender includes a display name, an email address (e.g., "from" email address), a reply-to address, a phone number, an image, a content link, or any other identifier/identification of the sender specified in the message. The data field of the message may be included in a header of the message. For example, the data field of the message is a "From:" field, a "Reply-To:" field or a "Return-Path:" field of an email message header. In some embodiments, the message is a SMS message or a MMS message and a phone number of the sender in the data field is modified. For example, the sender phone number is removed or changed to a different number. In some embodiments, modifying data included in the data field includes modifying a location identifier of content associated with the sender of the message. For example, a URL to an image of the sender is modified to reference a different image (e.g., replacement image includes a warning message).

One example filtering is quarantining the message and sending an automated message to the email address in the "From:" field of the message regarding the quarantine. The automated email may require the recipient to click on a hyperlink that is unique and not predictable to an attacker. If the system determines that such a link was clicked on (e.g., by receiving a corresponding GET request), then the email may be taken out of quarantine and delivered.

Another example filtering is sending an automated email in response to the received message (e.g., whether to the address in the from field or a potential address in the 'reply-to' field or both), requiring the recipient to click on a hyperlink where he or she has to enter a code obtained from an authenticator module, such as a SecurID token or Google authenticator app. If the entered code is correct, the message is taken out of quarantine and delivered.

In an alternative embodiment, the received message is not quarantined but delivered to its recipient after being modified. For example, a warning message is added to one or more header fields and/or the body of the message (e.g., add warning message to subject of message, add warning message to modify sender address, etc.). In some embodiments, the received message is modified to change, remove, and/or censure at least a portion of the message (e.g., remove attachment, remove hyperlinks, remove/modify reply to address, etc.).

If at 508 it is determined that the sender of the message is not similar to a trusted contact, the process returns to 506. In an alternative embodiment, if at 508, it is determined that the sender of the message is not similar to a trusted contact, the message identified for filtering if the recipient of the message has never sent a message to the sender of the message. In some embodiments, the total risk score determined using 406 of FIG. 4 is utilized to determine whether to allow full access to the message. If a value of the measure of total risk of the sender is above a threshold value, the message is identified as a risk and the message is filtered in 510 to reduce its risk to the recipient.

Figure 6A:
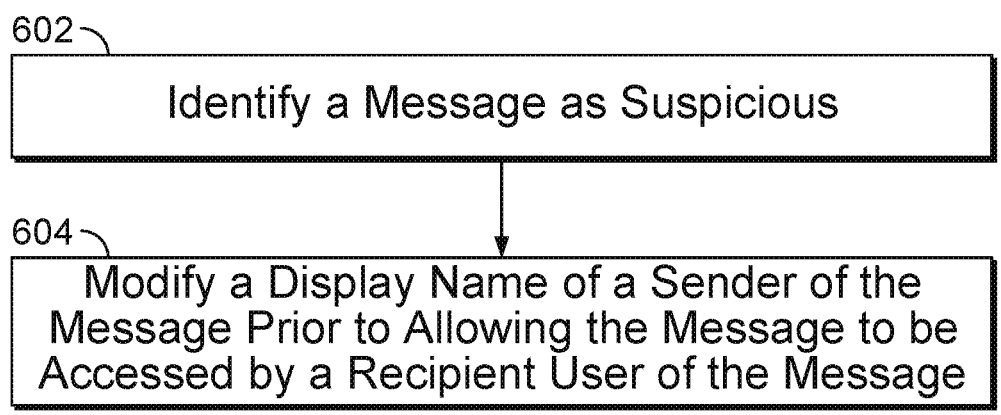
FIG. 6A is a flowchart illustrating an embodiment of a process for modifying a display name of a sender of the message.

FIG. 6A is a flowchart illustrating an embodiment of a process for modifying a display name of a sender of the message. The process of FIG. 6A may be at least in part implemented on analysis server 102, gateway 110 and/or message server 106 of FIG. 1. In some embodiments, at least a portion of the process of FIG. 6A is performed in filtering the message in 506 and/or 510 of FIG. 5.

At 602, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 604, a display name of a sender of the message is modified prior to allowing the message to be accessed by a recipient user of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name 'Pat Peterson.'" Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name.

In some embodiments, in addition to or instead of the display name, an email address of the sender is also modified. For example, the entire "From:" field of a header of the message that includes both the display name and an email address is modified with a warning.

Figure 6B:
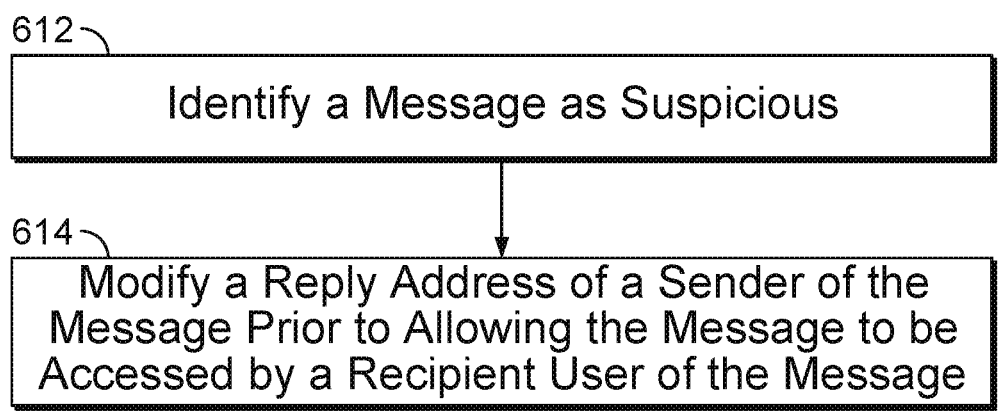
FIG. 6B is a flowchart illustrating an embodiment of a process for modifying a reply address of a sender of the message.

FIG. 6B is a flowchart illustrating an embodiment of a process for modifying a reply address of a sender of the message. The process of FIG. 6B may be at least in part implemented on analysis server 102, gateway 110 and/or message server 106 of FIG. 1. In some embodiments, at least a portion of the process of FIG. 6B is performed in filtering the message in 506 and/or 510 of FIG. 5.

At 612, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 614, a reply address of a sender of the message is modified prior to allowing the message to be accessed by a recipient user of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email.

In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause on some message clients to bounce the email.

Figure 7:
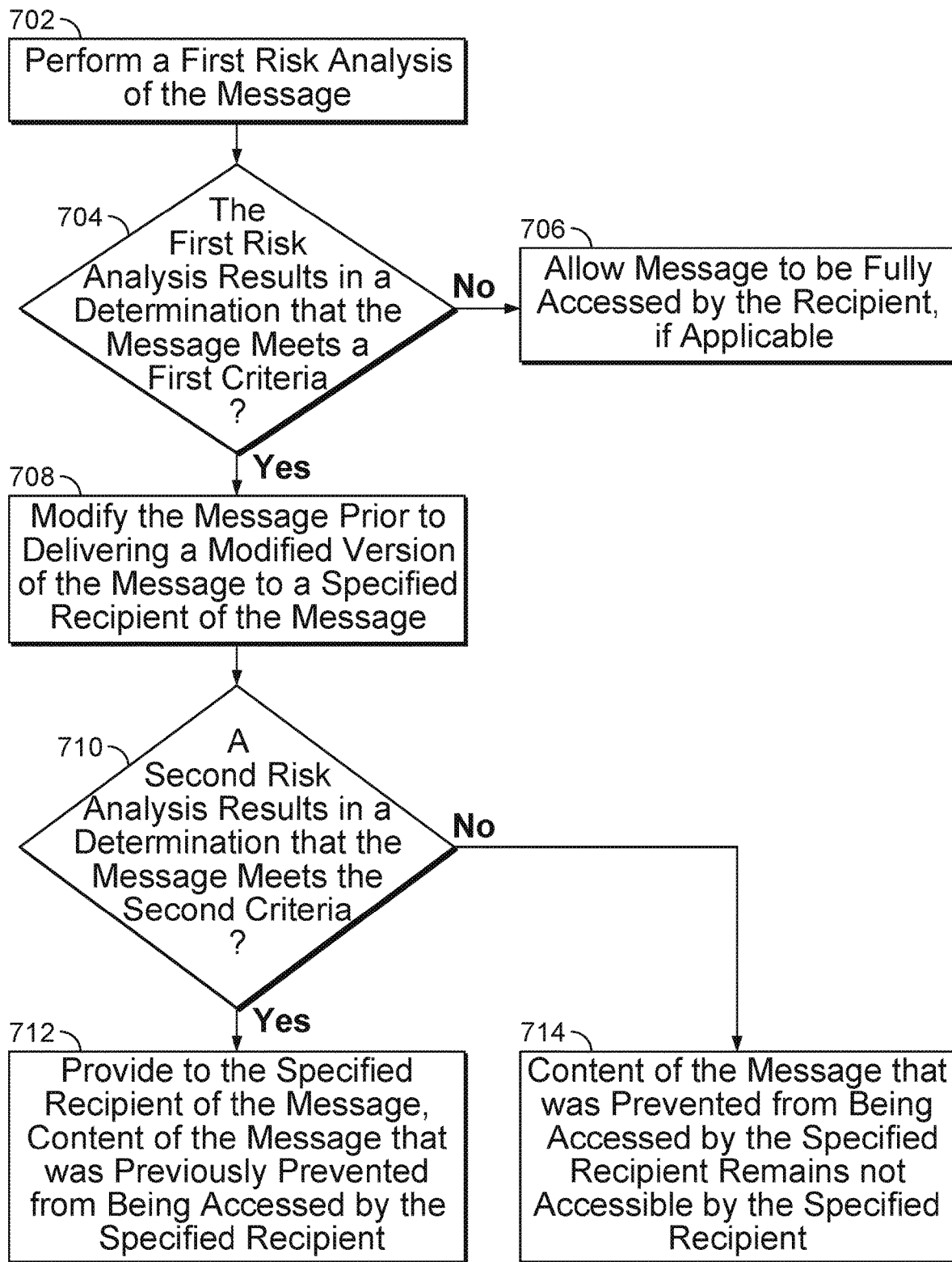
FIG. 7 is a flowchart illustrating an embodiment of a process for securing a message.

FIG. 7 is a flowchart illustrating an embodiment of a process for securing a message. The process of FIG. 7 may be at least in part implemented on analysis server 102, gateway 110 and/or message server 106 of FIG. 1. In some embodiments, at least a portion of the process of FIG. 7 is performed in filtering the message in 506 and/or 510 of FIG. 5. In some embodiments, at least a portion of the process of FIG. 5 is performed in the process of FIG. 7.

At 702, a first risk analysis of the message is performed. For example, it is determined whether the message is suspicious. In some embodiments, steps 504 and/or 506 of FIG. 5 is performed in 702. For example, it is determined whether the sender of the message is similar to a trusted contact. By determining whether the sender of the message is similar to a trusted contact, a likelihood of confusion by a recipient of the message that the message is from a trusted contact may be determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 202 and/or 204 of FIG. 2. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

At 704, it is determined whether the first risk analysis results in a determination that the message meets a first criteria. For example, it is determined whether the message meets a criteria to be deemed suspicious. In some embodiments, message meets the first criteria if a measure of similarity (e.g., string distance measure) meets a threshold value. For example, if any string distance measure determined for a list of trusted contacts (e.g., determined in 702) is greater than a threshold value, the message is identified as potentially an impersonation attack message and it is determined that the message meets the first criteria.

In some embodiments, the message meets the first criteria if a sender of the message has not previously sent a message to a recipient identified in the message. In some embodiments, the message meets the first criteria if a recipient identified in the message has not previously sent a message to the sender of the message. In some embodiments, the message meets the first criteria if a spam detector, a virus detector, and/or a malware detector has detected that the message includes a spam, virus or malware.

In some embodiments, a total risk score determined using 406 of FIG. 4 is utilized to determine whether message meets the first criteria. For example, if a value of the measure of total risk of the sender is above a threshold value, the message is identified as meeting the first criteria.

If at 704 it is determined that the message does not meet the first criteria, at 706 the message is allowed to be fully accessed by the recipient, if applicable. For example, because the sender of the message exactly matches the trusted contact or sender of the message is not similar to any trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware.

If at 704 it is determined that the message does meet the first criteria, at 708 the message is modified prior to sending a modified version of the message to a specified recipient of the message. For example, a warning message is added to one or more header fields and/or the body of the message (e.g., add warning message to subject of message, add warning message to modify sender address, etc.). The first risk analysis is performed before sending the modified version of the message. Sending the modified version may include delivering the modified version to the specified recipient (e.g., deliver to a mailbox of the specified recipient on server 106 of FIG. 1).

In some embodiments, modifying at least a portion of the message includes modifying (e.g., replacing, adding or removing/deleting) data included in a data field of the message that includes an identification of the sender of the message (e.g., modify an identifier of the sender). Examples of the identification of the sender includes a display name, an email address (e.g., "from" email address), a reply-to address, or any other identifier/identification of the sender specified in the message. The data field of the message may be included a header of the message. For example, the data field that includes the identification of the sender is a "From:" field, a "Reply-To:" field or a "Return-Path:" field of an email message header. The contents of the data field may be modified to provide a warning to a recipient, prevent a potential confusion of an identity of the sender of the message by the recipient of the message and/or prevent the recipient from responding to the message or sending a message to the sender of the message.

In some embodiments, the received message is modified to change, remove, and/or censor at least a portion of a content of the message (e.g., remove attachment, remove hyperlinks, remove a portion of the message content beyond a selected beginning body portion, etc.). For example, a message body section of an email message is modified to censor at least a portion of a content of the email message. In some embodiments, modifying the message includes inserting an inquiry associated with a verification of the sender of the message, wherein the inquiry requests a user response.

At 710, a second risk analysis of the message is performed and it is determined whether the second risk analysis results in a determination that the message meets the second criteria. In some embodiments, the modified version of the message is sent to the specified recipient of the message (e.g., sent to a mailbox of the specified recipient on server 106 of FIG. 1) prior to a conclusion of the second risk analysis. For example, the modified version of the message is sent and delivered to a mailbox of the specified recipient of the message prior to the conclusion of the second risk analysis. In some embodiments, the second risk analysis concludes upon determination of whether the second risk analysis results in a determination that the message meets the second criteria.

In some embodiments in 710, any of a plurality different types of verification/security actions may be performed to further analyze and verify the message (e.g., verify an identity of the sender of the message). For example, it is determined whether a classification of the sender of the message requested and received from the specified recipient of the message matches an automatically identified classification of the sender, and it is determined the message meets the second criteria if a user response to the requested classification matches the automatically identified classification (e.g., see the process of FIG. 8A). In another example, an automatically generated reply message to a received message is sent the sender of the received message requesting verification of an identity of the sender of the message and it is determined the message meets the second criteria if the sender has provided a valid identity in response to the reply message (e.g., see the process of FIG. 9A).

If 710 it is determined that the second risk analysis results in a determination that the message meets the second criteria, at 712, content of the message that was previously prevented from being accessed by the specified recipient is provided to the specified recipient of the message. The second risk analysis may be a more in-depth and/or resource intensive analysis of the message reserved for messages that fail the first risk analysis. For example, an original version of the message prior to the modification in 708 is sent to the specified recipient of the message. This original version may be a duplicate message in addition to the initially provided modified version of the message (e.g., original version delivered as a new message to the specified recipient) or this original version may be a replacement message of the initially provided modified version of the message (e.g., initially provided modified message is deleted from mailbox of the specified recipient of the message and replaced with the original version). In some embodiments, the content of the message that was previously prevented from being accessed is included a new message sent to the specified recipient of the message.

If 710 it is determined that the second risk analysis results in a determination that the message does not meet the second criteria, at 714 content of the message that was prevented from being accessed by the specified recipient remains not accessible by the specified recipient. In some embodiments, the message is deleted or quarantined. For example, after a period of time of message not meeting the second criteria and/or if it is determined during the second risk analysis that the message is potentially hazardous to a specified recipient of the message, the message is automatically deleted or quarantined to prevent access by the specified recipient to the entire message. In some embodiments, a notification is provided to an administrator. For example, the administrator is provided a warning about the message failing the second risk analysis.

Figure 8A:
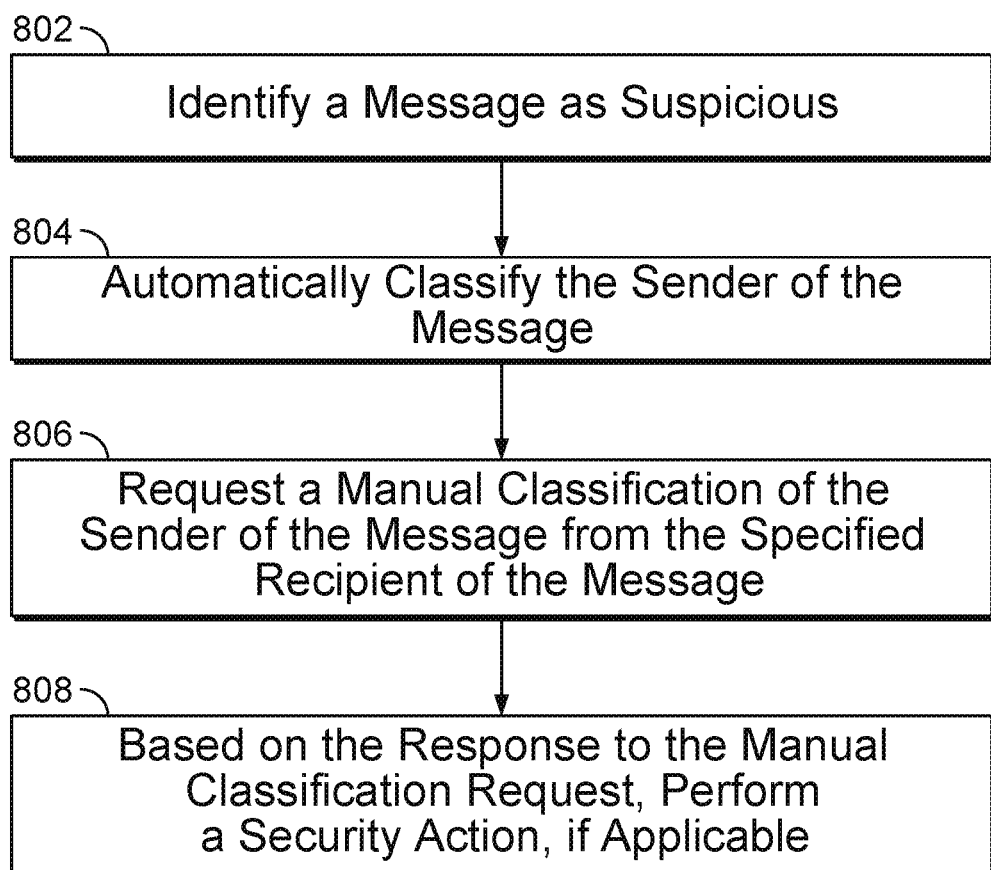
FIG. 8A is a flowchart illustrating an embodiment of a process for detecting misrecognition of a sender of a message by a recipient of the message.

FIG. 8A is a flowchart illustrating an embodiment of a process for detecting misrecognition of a sender of a message by a recipient of the message. The process of FIG. 8A may be at least in part implemented on analysis server 102, gateway 110 and/or message server 106 of FIG. 1. In some embodiments, at least a portion of the process of FIG. 8A is performed in filtering the message in 506 and/or 510 of FIG. 5. In some embodiments, least a portion of the process of FIG. 8A is performed in one or more steps of the process of FIG. 7. For example, at least a portion of the process of FIG. 8A is performed in performing the first and/or second risk analysis of the process of FIG. 7.

At 802, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

In some embodiments, by basing the whether the message is suspicious on knowledge about trusted contacts of the specified recipient of the message, a message is only classified as suspicious and risky based on the likelihood that the recipient will confuse the sender with a trusted contact specific to the recipient. Otherwise, the risk may be marginal if the recipient does not know or trust the sender of the message since the sender is likely not impersonating someone that the recipient already knows. Thus a message is particularly dangerous if it is not from a trusted party, but the recipient thinks it is. In contrast, if the recipient knows that an email from an untrusted party is from an untrusted party, he or she is not as much at risk as he or she is not likely to feel compelled to comply with the requests or instructions in the message At 804, the sender of the message is automatically classified. In some embodiments, classifying the sender includes identifying a classification/category of the sender. For example, a relationship classification/category of the sender with respect to the specified recipient of the message is automatically determined based on a property of an identifier of the sender (e.g., domain), previous message history between the sender and recipient, and/or other list or database (e.g., database of business contacts of the recipient). Examples of the classification of the sender include a college, a business partner, a friend/acquaintance, or unknown.

For example, if the sender is associated with the same domain as the recipient, then the sender is classified as a colleague classification. This classification may also be used if the email address of the sender is a known personal email address of a user with a colleague message address. This personal address may be determined using manual registration of such addresses by the account owner, as well as by identification of message traffic indicative of a work account being related to a personal account, such as having closely related display names and extensive forwarding of material from one account to the other. If the sender is a service provider or a client of an entity associated with the recipient, then the sender is classified as a business partner classification. This type of classification may be identified by detection of a sufficient volume of message traffic over time between the sender and the recipient, or from a database/list of recorded business contacts/relationships. In some embodiments, the sender is classified as a friend/acquaintance classification for a given sufficient volume of message traffic over time between the sender and the recipient but cannot be classified as a colleague or a business partner. If the sender cannot be classified as a colleague, business partner, or friend/acquaintance, the sender is classified as known/stranger.

In some embodiments, the sender of the message is automatically classified based on a list of trusted contacts tracked for the recipient (e.g., tracked using the process of FIG. 2). For example, a trusted contact in the stored list of trusted contacts may be associated with a classification identifier provided by a user and/or automatically determined. An identifier of the sender of the email may be utilized to locate a corresponding entry in the stored list of trusted contacts to identify its classification.

At 806, a manual classification of the sender of the message is requested from the specified recipient of the message. For example, before the message is fully provided to the recipient, a classification of the sender of the message is requested from the user in order to verify the recipient's believed classification of the sender as compared to the automatically determined classification. In some embodiments, the message is modified to change, remove, or obfuscate (e.g., remove attachment, remove hyperlinks, hide phone numbers, only retain a beginning portion of contents of the message and hide ending portion of the message, etc.) at least a portion of the message to prevent the recipient from having full access to the message prior to verification of the recipient's knowledge about the sender of the message. In some embodiments, the message is modified to include selection choices corresponding to the classification options (e.g., different selectable HTML hyperlinks included in the message and selection of a particular hyperlink option sends a request to the unique address of the hyperlink that can be detected by a server to identify which classification option was selected based on the unique address of the request corresponding to the selection option). In some embodiments, if a recipient replies to the message to the sender prior to providing the classification, the reply message is held/quarantined at a mail server until it is determined that it is safe to send the message. Another classification option is to identify the sender as a spammer or malware attacker. Selection of this classification may result in the removal of the email and blocking of future messages from the sender.

FIG. 8B shows an example of a modified message requesting manual classification of the sender of the message. Message 820 includes contents of the original message 822 as well as added selected choices 824 that requests the recipient to classify the sender of the message.

Returning to FIG. 8A, at 808, based on the response to the manual classification request, a security action is performed, if applicable. In some embodiments, if the manual classification response does not match the automatically determined classification, a security action is performed to warn the recipient about the mismatch and/or prevent the user from fully accessing or replying to the message. For example, the message may be deleted and replaced with a version of the message that has been modified (e.g., subject, sender display name, sender address, reply to address, and/or content of the message removed or modified with a warning indicator). In another example, the message may be deleted and quarantined for additional review by the recipient and/or an administrator. In some embodiments, in the event the sender of the message was correctly classified manually by the recipient and the automatic classification was incorrect, an opportunity is provided to add the sender of the message to the list of trusted contacts for the recipient and/or add an identifier of the sender (e.g., email address and display name) to an existing contact (e.g., as a secondary email address) in the list of trusted contacts. The sender may be added to the list of trusted contacts by the recipient, an administrator, or by the sender (e.g., by requiring the user to prove access to an account of an existing trusted contact).

Figure 9A:
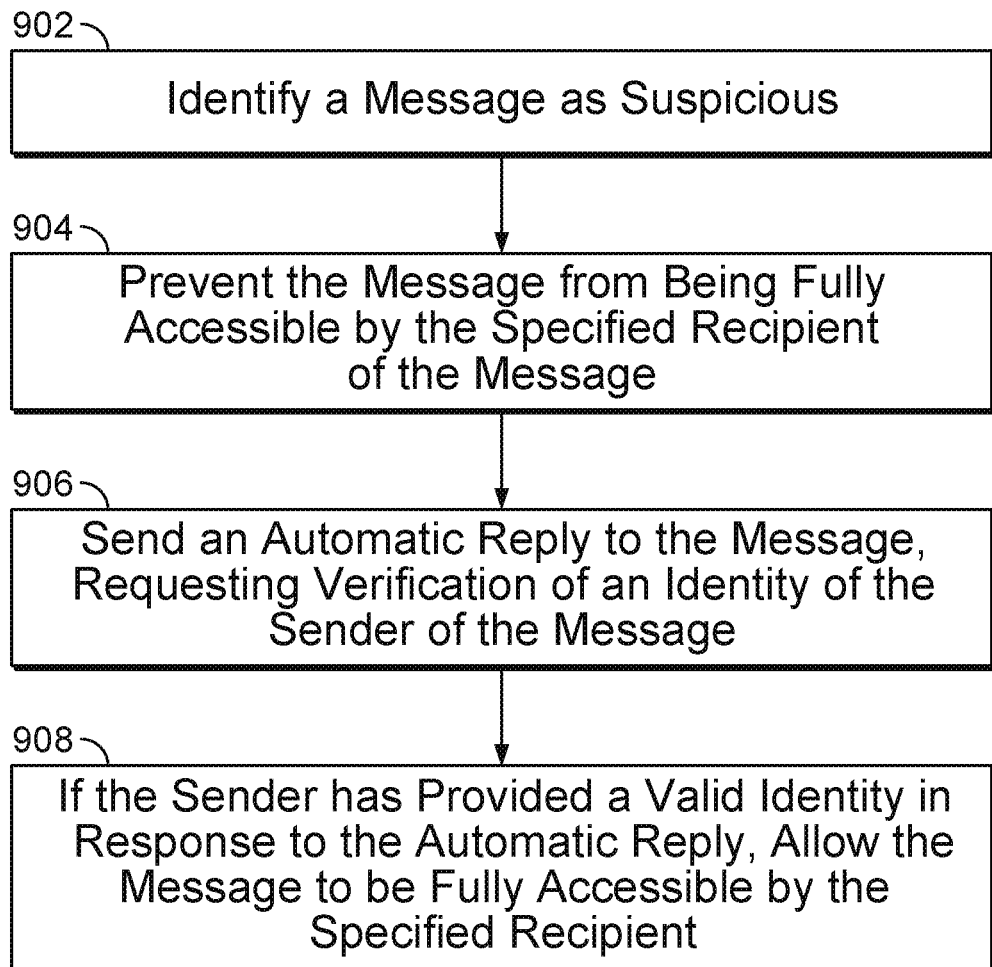
FIG. 9A is a flowchart illustrating an embodiment of a process for requiring a sender of a message to verify an identity of the sender.

FIG. 9A is a flowchart illustrating an embodiment of a process for requiring a sender of a message to verify an identity of the sender. The process of FIG. 9A may be at least in part implemented on analysis server 102, gateway 110 and/or message server 106 of FIG. 1. In some embodiments, at least a portion of the process of FIG. 9A is performed in filtering the message in 506 and/or 510 of FIG. 5. In some embodiments, least a portion of the process of FIG. 9A is performed in one or more steps of the process of FIG. 7. For example, at least a portion of the process of FIG. 9A is performed in performing the first and/or second risk analysis of the process of FIG. 7.

At 902, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus or malware.

At 904, the message is prevented from being fully accessible by the specified recipient of the message. For example, at least a portion of the message is modified or removed. In another example, the message is quarantined and not delivered to the recipient.

At 906, an automatic reply to the message is sent requesting verification of an identity of the sender of the message.

This verification attempt may be utilized to identify good emails from accounts that are not trusted, but which are nevertheless associated with trusted persons. For example, if one executive's name is John Adams, and another executive receives an email from a John Adams—but not the same account as to which she has a trust relationship—then this is a potentially deceptive email—but also an email that is potentially from another account (such as the personal account) of the trusted person. The reply message includes the message "Your email triggered an alert. Have you sent emails to the recipient using another email address? If so, please click here. Otherwise, click here." The first hyperlink (associated with the first occurrence of "here") would lead to a website where the visitor enters his or her "other" email address (e.g., trusted contact address), and a verification email is sent to that address. That verification email contains a challenge value, such as a secret string of alphanumeric characters, that the recipient has to copy and paste into the site where the email address was entered. The second hyperlink takes the user to a site where he or she is offered to solve a CAPTCHA, associate a phone number (e.g., by sending an SMS challenge value to the phone number), or perform another action that attackers are typically unwilling to perform.

FIG. 9B shows an example of an automatic reply message requesting verification of an identity of the sender of the message. Message 920 informs the user that the sender's message has been quarantined and will not be delivered unless identity of the sender is established. Message 920 instructs the sender to forward the automatic reply message to a second message account (e.g., account of trusted contact) that the sender has previously used to communicate with the recipient and using the second account, forward again the forwarded message to a verification system for verification of the possession of the second account.

Returning to FIG. 9A, the automatic reply to the message may be utilized to detect spoofing attempts. For example, the automatic reply is sent to a system of the sender to request verification that the sender identified in the message actually sent the message. For example, at least two installations of message security systems, where a first installation is associated with a first entity and a second installation is associated with a second entity, the second system identifies receipt of an email originating with a sender associated with the first system. The second system then sends an inquiry to the first system, where the inquiry contains information related to the email. The first system determines whether the email associated with the inquiry was sent from the indicated apparent sender, and generates a response to the second system. If the second system receives a negative response, then the email is not delivered to the intended recipient, or if it has already been delivered, then it is either removed from the inbox or a notification is sent to the recipient, warning the recipient of the email. In addition, a notification may be sent to an administrator associated with the second system. In some embodiments, a notification is also sent to an admin associated with the first system. If, on the other hand, the response to the inquiry is a positive response, then the email is delivered to the recipient. If an email has more than one recipient within the second system, then it is delivered to each such recipient. Here, the first and second systems may access emails in different ways. For example, the first system may correspond to an outbound collector of emails and the second system to an OAUTH access of one or more email boxes. The first system may also be an appliance controlling or relaying emails, or be an OAUTH-enabled method to access the various mailboxes (including the sent folder) of one or more users. In some embodiments, all communications between the two security systems are encrypted and authenticated.

At 908, if the sender has provided a valid identity in response to the automatic reply in 906, the message is allowed to be fully accessible by the specified recipient. For example, if the user has provided an established position of an alternate trusted account that can be trusted (e.g., account of trusted contact) or has otherwise provided or proved an identity of the sender, the message is allowed to be fully accessible. Making the message fully accessible may include allowing the message to be delivered and accessed by the recipient with all of its original content. This may also cause the sender (e.g., sender email address) to be whitelisted or associated with an increased trust value (e.g., add to trusted contacts). In some embodiments, the provided full access message includes a warning, bringing to the attention of the recipient that this is an email from a potential stranger.

If the sender does not provide a valid identity in response to the automatic reply in 906, the message may remain unable to be fully accessible by the specified recipient of the message. In some embodiments, the message is indicated to an administrator and/or deleted.

In some embodiments, if the reply to the address of the message is identified or unknown to be unattended (e.g., not monitored by a recipient user), the message is provided to the recipient in a modified form and/or with a warning.

Figure 10:
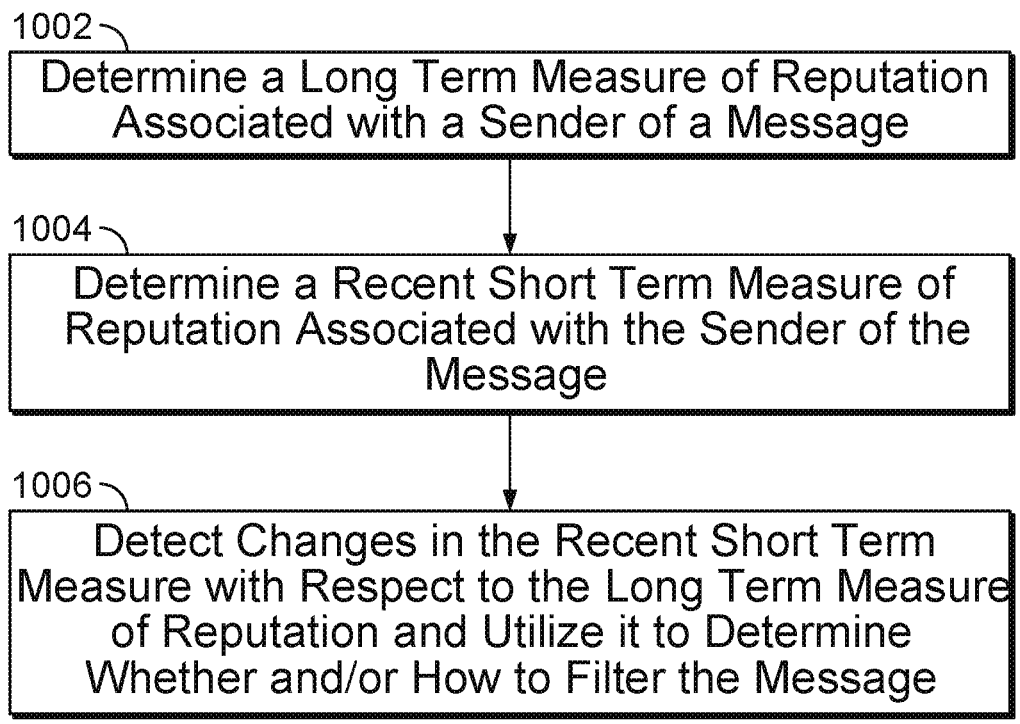
FIG. 10 is a flowchart illustrating an embodiment of a process for determining a change in historical reputation of a sender of a message.

FIG. 10 is a flowchart illustrating an embodiment of a process for determining a change in historical reputation of a sender of a message. The process of FIG. 10 may be at least in part implemented on analysis server 102, gateway 110 and/or message server 106 of FIG. 1. In some embodiments, at least a portion of the process of FIG. 10 is performed in filtering the message in 506 and/or 510 of FIG. 5. In some embodiments, least a portion of the process of FIG. 10 is performed in one or more steps of the process of FIG. 7. For example, at least a portion of the process of FIG. 10 is performed in performing the first and/or second risk analysis of the process of FIG. 7.

At 1002, a long term measure of reputation associated with a sender of a message is determined. The long term measure of reputation may be for a specific address and/or domain of the sender. For example, long term measure of reputation is determined based on the amount of historical message traffic between the sender (or network domain of sender) and the recipient (or network domain of recipient). Large amounts of traffic may correspond to a high long term measure of reputation, unless there is a sufficient portion of the traffic that is flagged as undesirable (e.g., being spam, including virus/malware, etc.). Additionally, a long time period of traffic may correspond to a high long term measure of reputation, unless a sufficient portion is flagged as being undesirable. To the extent that it is available, a large open rate (e.g., the recipient opened the message) or a high response rate (e.g., whether replying to message or selecting links in message) also may correspond to a high long term measure of reputation, unless a sufficient portion is flagged as being undesirable. An example of a "sufficient" portion may mean that a fixed portion of the traffic, such as 2%. The long term measure of reputation may capture historical message traffic within several recent months. In some embodiments, when determining a long term measure of reputation for a domain, individual long term measures of reputation for accounts of the domain may be aggregated to determine the long term measure of reputation for the domain.

At 1004, a recent short term measure of reputation associated with the sender of the message is determined. The recent short term measure of reputation may be for a specific address and/or domain of the sender. The recent short term measure of reputation is determined using the same/similar factors as the long term measure of reputation but within a smaller time window. For example, the recent short term measure of reputation may capture historical message traffic within a day.

The recent short term measure of reputation may be low if a large portion (e.g., 5% of traffic within the time window) of message traffic between the sender (or network domain of sender) and the recipient (or network domain of recipient) is associated with complaints, spam detection, the detection of unwanted URLs, or unwanted attachments. An unwanted URL/attachment is one that is judged likely to be associated with risk, e.g., using a blacklist or an anti-virus scan. Complaints may correspond to users reporting an email as spam or phish, or placing it in a spam folder. Complaints can either be local (only a very small number of users, such as less than 1% of recipients, report the message) or pervasive (a greater portion of users report the email, e.g., more than 1%).

At 1006, changes in the recent short term measure with respect to the long term measure of reputation are detected and utilized to determine whether and/or how to filter the message. For example, if the sender is associated with a low (bad) long term measure of reputation (e.g., below a threshold) and a low (bad) recent short term measure (e.g., below another threshold), the message from the sender is identified as suspicious and filtered (e.g., blocked and/or modified with a warning). In some embodiments, if the sender is associated with a high (good) long term measure of reputation (e.g., above a first threshold) but low (bad) recent short term measure (e.g., below a second threshold), the message from the sender is identified as likely taken over by a malicious attacker. For example, the message may be filtered (e.g., blocked and/or modified with a warning), may require manual review by an administrator, or require an action by the sender (e.g., require sender to respond to a challenge) prior allowing delivery of the message (e.g., modified message with warning).

In some embodiments, let $R_i$ be a reputation associated with a receiver, and for concreteness, assume that this corresponds to a numeric value between 0 and 1, inclusive. Let $B_i$ be a recent short term measure of reputation associated with an email E received by the same recipient. For concreteness, this is also a value between 0 and 1, inclusive. Here, i is a number corresponding to the recipient. Further, let G be the long term measure of reputation associated with the email E, and may be a number between 0 and 100, for example. The value $SUM(B_i*R_i)/G$ is computed, where SUM corresponds to adding the entries associated with all recipients of E. If $SUM(B_i*R_i)/G > t1$, where t1 is a first threshold, then a first action is taken. This action may be to block emails from the sender of E, remove E from the inbox of all recipients, and determine whether any of the users who appear to have opened E have had their computers corrupted or credentials stolen. This can be determined by asking the user, by scanning the user's machine, or by reviewing logs of incoming/outgoing traffic to the user's machine, where this review is preferably automated. Further, the action may involve increasing $R_i$ by 10% for each user who filed a response $B_i$ indicative of a threat. If $SUM(B_i*R_i)/G < t2$, where $t2 < t1$ then the reputation $R_i$ of each user who filed a response $B_i$ indicative of a threat is decreased, e.g., by 5%. If the number of users filing a response $B_i$ is indicative of a threat within a time T of receipt of the email E, then the email is considered to be associated with pervasive badness, otherwise local badness.

Figure 11:
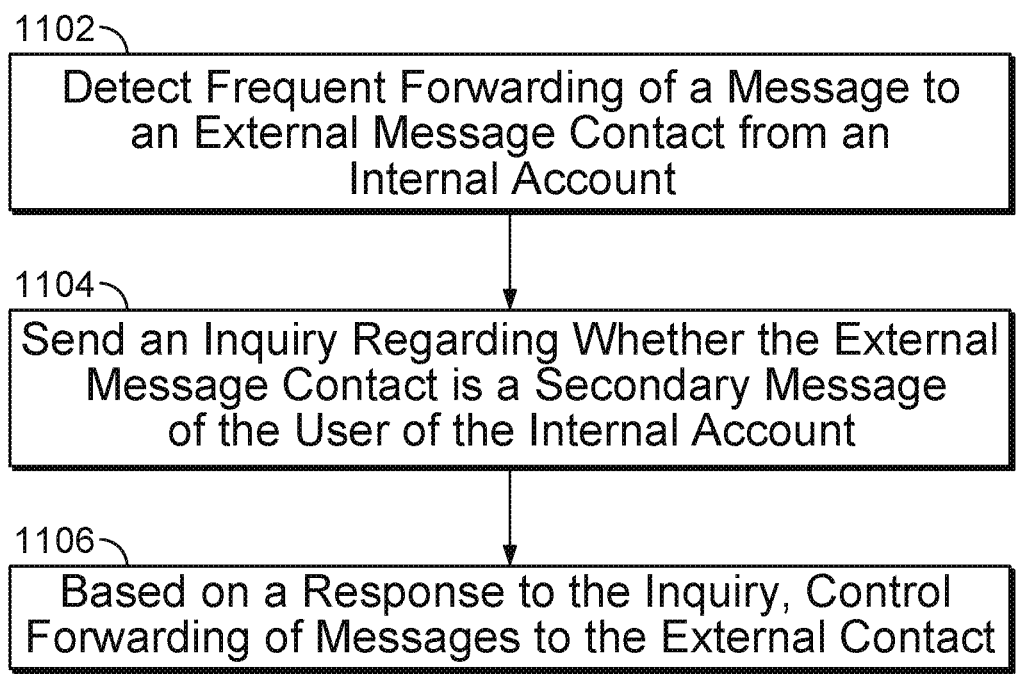
FIG. 11 is a flowchart illustrating an embodiment of a process for linking a secondary message account of a user.

FIG. 11 is a flowchart illustrating an embodiment of a process for linking a secondary message account of a user.

The process of FIG. 11 may be at least in part implemented on analysis server 102, gateway 110, and/or message server 106 of FIG. 1.

At 1102, frequent forwarding of a message to an external message contact from an internal account is detected. For example, it is detected that a threshold number of messages have been forwarded to the same external contact for a user message account. For example, a member of an organization has an email address joe@organization.org, and a display name "Joe Schmoe." This first member occasionally forwards calendar invites sent to him to an external account s123@gmail.com, which has a display name "J. Schmoe," and it is detected that a threshold number of messages (e.g., email messages, calendar invitations, etc.) have been forwarded to s123@gmail.com.

At 1104, an inquiry regarding whether the external message contact is a secondary message of the user of the internal account is sent. For example, a message is sent to joe@organization.org asking "Is s123@gmail.com your email address? Click yes or no.", where the words "yes" and "no" are hyperlinked.

At 1106, based on a response to the inquiry, forwarding of messages to the external contact is controlled. For example, if the user clicks on "yes" to the inquiry message sent in 1104, the system links the external message contact to the internal account (e.g., the external contact address, s123@gmail.com, is assigned the same trust level as that of an internal member of the organization) and future forwards to the external contact are allowed. If the user responds "no," then the system may continue to observe further actions, such as forwarding of calendar invites, and if a second threshold number of such messages or invitations are detected, then the user is asked again or a notification is sent to an admin or the manager of the internal account, bringing the potential relationship to the attention of the manager. The "no" response may also disable forwarding of messages to the external contact.

In another example, a collection of users in the organization receive two emails; one from joe@organization.org and another from s123@gmail.com. If the collection of users is sufficiently large, such as at least five users in size, then it is unlikely that they would receive emails from two users with the same or similar display name if these two users do not correspond to the same person. In this case, at least one of the two email accounts is sent a message asking whether the two accounts correspond to the same person. Assume that the external account s123@gmail.com is sent the message "Is joe@organization.org your email address? Click yes or no." If the user clicks yes then he is told that a code will be sent to joe@organization.org—the user is asked to email this same code from the account s123@gmail.com to confirm the linkage, or to paste the code into a webpage that he is taken to when clicking on "yes." If the user clicks no and a transmission pattern suggesting a relation persists, then another message is sent, inquiring about the relationship, or a manager or admin is sent a notification.

In some embodiments, if a user indicates that two accounts are related, then the external account is preferably requested to sign up for protection of the external account (e.g., by providing the internal account system access (e.g., limited access) to the external account). If the user does not sign up for protection within a set amount of time (e.g., one week), traffic between the two accounts (e.g., joe@organization.org and s123@gmail.com) is filtered. This filter may be to block all such traffic, block certain types of such traffic such as calendar invites, delay such traffic, bring such traffic to the attention of the manager of the person, or some other action. This encourages enterprise users to link personal accounts with their work accounts to increase the protection of both accounts.

Figure 12:
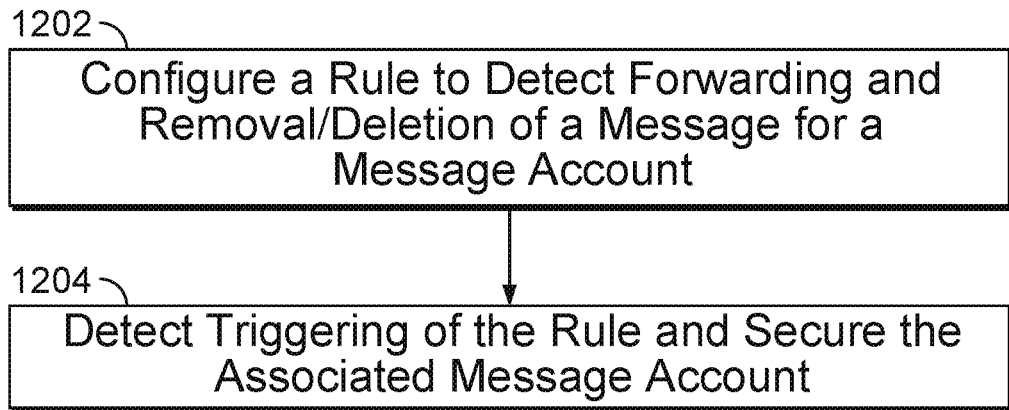
FIG. 12 is a flowchart illustrating an embodiment of a process for detecting an account take over.

FIG. 12 is a flowchart illustrating an embodiment of a process for detecting an account take over. The process of FIG. 12 may be at least in part implemented on analysis server 102, gateway 110 and/or message server 106 of FIG. 1.

At 1202, a rule to detect forwarding and removal/deletion of a message is configured for a message account. For example, after an enterprise has been secured by an email security system, one should preferably also secure perimeter accounts. One example of a perimeter account is the personal email address of an employee of the enterprise. Another example of a perimeter account is the personal or work account of a person associated with an employee of the enterprise, such as the spouse or babysitter of a person with an account at the enterprise. Other examples are the email address of a vendor associated with the enterprise and a personal email address of the vendor.

Enterprise accounts may be protected using one architectural approach, such as rewriting the MX records for the enterprise. The perimeter accounts may be protected using the same or a different architectural approach. For example, a user may grant an enterprise or another controlling entity authorization to access the user perimeter account (e.g., OAUTH access). The authorization may be a limited access to establish and utilize the rule. Enterprise accounts may be protected using a first collection of filters, e.g., filters that determine who all users are who commonly interact with a given account, and blocking any email that is considered unsafe. Perimeter accounts may either be protected in the same manner, or in a different manner. For example, perimeter accounts could simply be protected by determining whether they are likely to have been ATOed (i.e., taken over) by an attacker; with no traffic other than likely ATO threats being blocked; and without determining who are commonly interacting with the perimeter account.

A perimeter account is determined to have a heightened risk of having been ATOed if copies of some emails known to have been sent to the account are found by the security system to have been immediately forwarded to another email address. This can be determined in several ways. One way is if an email sent by a protected enterprise account is found not to be delivered to the inbox of the perimeter account, but found in the sent box of the perimeter account. Here, the security system can inject the message from the protected enterprise system, and the message can be empty or contain a legitimate-looking text. If an injected message is found to be delivered in the inbox of the perimeter account, then the security service deletes it so that the end user is not confused. If it is found to be automatically forwarded by being found in the sent box, then the system determines that the risk associated with the perimeter account is increased. The risk is very high if it is found that messages are selectively forwarded, and that those that are forwarded are not delivered to the inbox. This can be achieved by setting a simple sender-specific rule, and is commonly done by attackers having ATOed an account. The security system detects that messages are selectively forwarded if at least one message is found to be automatically or very quickly forwarded, whereas another message is delivered into the inbox of the perimeter account. A perimeter account can also be found to be associated with a high risk if its communication behavior suddenly changes, e.g., an unusual number of messages are sent within a short period of time, or high-risk keywords are found in outgoing messages. A perimeter account can be protected against some classes of abuse by active filtering. Such filtering can be the same as what is used for the enterprise accounts that are protected, or use some of the filter rules, and may also use additional filter rules not suitable to an enterprise. For example, an enterprise may filter out any commercial offer emails, whereas users of perimeter accounts may want these; at the same time, an enterprise account might not filter out messages with wire instructions whereas a perimeter account may have filters associated with it that flag any such messages and add a warning to them, since such messages are commonly used by scammers, but are also in common enterprise-to-enterprise communications.

At 1204, triggering of the rule is detected and the associated message account is secured. For example, when the rule is triggered and a threat is detected for the account, then all messages from the account to other accounts of a protected enterprise are treated as being high-risk. This results in modification or blocking of at least a portion of messages. For example, it may result in blocking of all potentially risky attachments, quarantining all messages until they have been confirmed by the sender, after the sender is challenged using a secondary channel such as SMS, or adding warnings to such incoming messages.

Figure 13:
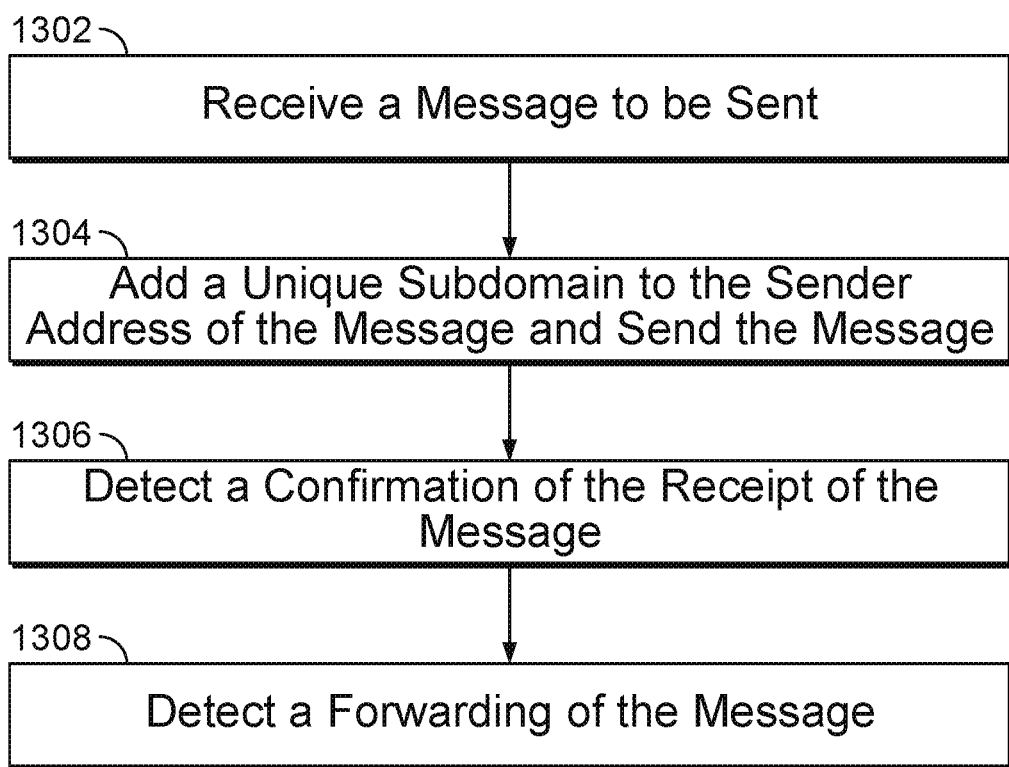
FIG. 13 is a flowchart illustrating an embodiment of a process for detecting forwarding of a message.

FIG. 13 is a flowchart illustrating an embodiment of a process for detecting forwarding of a message. The process of FIG. 13 may be at least in part implemented on analysis server 102, gateway 110, and/or message server 106 of FIG. 1. The detection of message forwarding may be helpful in the detecting of account take overs by a malicious attacker.

At 1302, a message to be sent is received. For example, an email message to be sent is received at an email server.

At 1304, a unique subdomain is added to the sender address of the message and the message is sent. For example, if the protected organization corresponds to a domain organization.org, and a user Bob has an account Bob@organization.org, and Bob wishes to send an email E to Alice at Alice@service.com, then an agent associated with the mail transfer agent (MTA) of organization.org will insert the unique subdomain in the sending address. If the unique subdomain is 67H7kT79q, then the sender of the email will be changed to Bob@67H7kT79q.organization.org. The display name for Bob can remain the same as it normally is, which may be "Bob Lastname," or it may be augmented with the unmodified email address to become "Bob Lastname <Bob@organization.org>."

At 1306, a confirmation of the receipt of the message is detected. For example, as the email E is transmitted to the message receiving service, the message receiving service will verify the DMARC record of the sender, causing a request for 67H7kT79q.organization.org to be generated to the DMARC provider on record for organization.org. Assuming 67H7kT79q.organization.org is valid, the provider will respond positively. Thus, it is detected that email E was received by the mail service provider associated with service.com.

At 1308, a forwarding of the message is detected. Based on this detection, message filtering and/or security action may be performed. For example, if Alice, the recipient of the email, has configured her email account Alice@service.com to automatically relay or forward emails (whether generally or selectively) and E as a result gets forwarded to service2.com, then service2.com, too, will make an inquiry to the DMARC provider of organization.org. By detecting the second DMARC inquiry quickly (e.g., within a threshold amount of time) after the first DMARC inquiry, automatic forwarding of the message is able to be detected. As a result, the DMARC provider will be able to monitor how the message E is (or is not) forwarded or relayed. Currently, such reports are generated on a daily basis, but as they become more frequent, the value of such information will increase. For each party communicating with users within organization.org, the DMARC provider, or an entity associated with it, will therefore be able to build a profile of expected behavior. These may change over time, e.g., if Alice goes on vacation and sets some messages to be forwarded, or if Alice's account gets taken over by a criminal who sets forwarding in order to steal messages from Alice and inserts himself into a conversation between Alice and Bob.

Whereas the DMARC provider or associated entity cannot determine with certainty whether a change in forwarding behavior is acceptable or not, it is helpful to flag any changes. It is also possible to record all the common forwarding behaviors for a user or associated domain, and determine when a new forwarding behavior is seen. It is furthermore practical to maintain a list of forwarding entities that are associated with high risk. Based on the presence of a forwarding change, and the nature of this, the system takes a security action. In one embodiment, this security action involves generating a challenge and sending it to the party communicating with the protected user, in this case causing a message to be sent to Alice@service.com. The message may require the recipient to click on a hyperlink to avoid further security actions—this enables the detection of IP addresses for the recipient, which in turn can be used to identify risk. Another security action is to modify messages sent from the flagged user to incorporate a warning, or remove any high-risk elements such as attachments of certain types associated with malware risk. Yet another security action is to modify messages sent to the flagged account, blocking transmission of sensitive documents. For example, any document appearing to comprise PII or other sensitive information can be automatically removed or redacted.

If the DNS lookup service were to always accept the first request for a DMARC related subdomain/domain lookup, but reject any consecutive lookups, and the email service is configured accordingly, this would result in the automated blocking of automated relaying of messages.

An alternative approach to rewriting sender addresses on all outbound emails for a protected domain is to provide a unique Mail From domain for all outbound emails, using a similar sub-domain approach for each message. For example the Mail From address might look like bounces@67H7kT79q.organization.org. In this case the SPF lookup done by the mail service provider, service.com, would look for an SPF record at the sub-domain 67H7kT79q.organization.org. Organization.org would need to create DNS TXT records for each unique sub-domain it uses in the Mail From field. This would allow the messages to pass SPF at service.com and pass the DMARC SPF alignment check at service.com. If the email is then forwarded to service2.com, the same SPF check by service2.com against 67H7kT79q.organization.org would fail. A record of the message with this unique Mail From domain would appear in the DMARC report from service.com with a passing result and in the DMARC report from service2.com with a failing result. Thus, DMARC analysis for organization.org would be able to detect the act of forwarding for this message.

Figure 14:
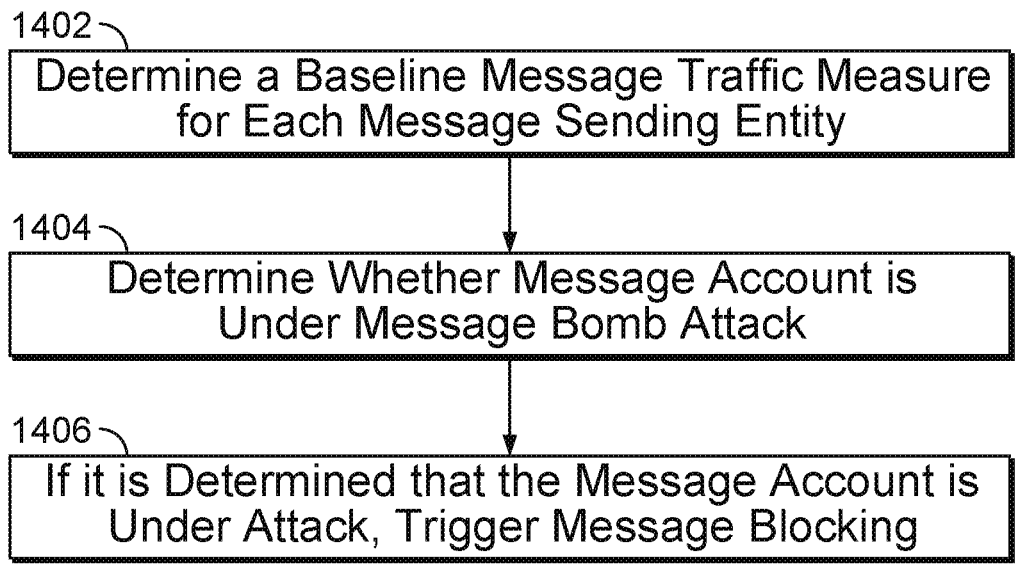
FIG. 14 is a flowchart illustrating an embodiment of a process for detecting message bomb attacks.

FIG. 14 is a flowchart illustrating an embodiment of a process for detecting message bomb attacks. The process of FIG. 14 may be at least in part implemented on analysis server 102, gateway 110, and/or message server 106 of FIG. 1. The detection of message forwarding may be helpful in the detecting of account take overs by a malicious attacker.

At 1402, a baseline message traffic measure is determined for each message sending entity. The message sending entity may be an individual sender for an organization (e.g., for Google Gmail, Facebook, and organizations that allow sign-ups to newsletters on their websites) that does not exercise strict control over its membership, while the sending entity may be an entire organization for organizations with tight control over membership (e.g., bank entity, where it is not possible for anybody to send to a selected account on behalf of the organization, or cause a transmission to a selected account on behalf of the organization). A list of message sending entities that have sent messages to users of an organization to be protected may be identified by tracking on a per-entity basis the amount of messages sent over a specified period of time. If a message sending entity has sent more than a threshold quantity of messages (e.g., at least three messages within two months), and where recipients have not marked these message as spam more than a spam threshold (e.g., less than 1%), the sending entity is included in a whitelist of trusted sending entities.

At 1404, it is determined whether a message account is under message bomb attack (e.g., message denial of service attack). In some embodiments to detect the attack, sudden spikes of incoming traffic are identified. For example, if the hourly volume for a target organization has never exceeded 800,000 emails over the last six months, then the threshold may be set to correspond to the same number of incoming emails in one minute, e.g., a 60-time increase compared to the historical limit. If at any time this threshold is exceeded, then message blocking is triggered. An alternative approach is to determine the number of emails sent from entities who are not whitelisted within a given time period. Assume the historical maximum is 20,000 for a minute, meaning that the system has not received more than 20,000 emails within one minute from senders who are not on the whitelist. Then the system may use a threshold of 100,000 emails from entities not on the whitelist for one minute, corresponding to a five-fold increase compared to the previous maximum. Exceeding this threshold would trigger the message blocking. It may be useful to be able to trigger the blocking system manually, or in reaction to another organization being under attack, or any combination of such triggers.

If it is determined that the message account is under attack, at 1406, message blocking is triggered. For example, when message blocking is triggered, all messages received from entities not on the whitelist are rejected or otherwise not delivered, until a second condition is met. This second condition may correspond to triggering the lifting of the blocking, and may be associated with the volume of emails falling below a threshold considered acceptable.

Figure 15:
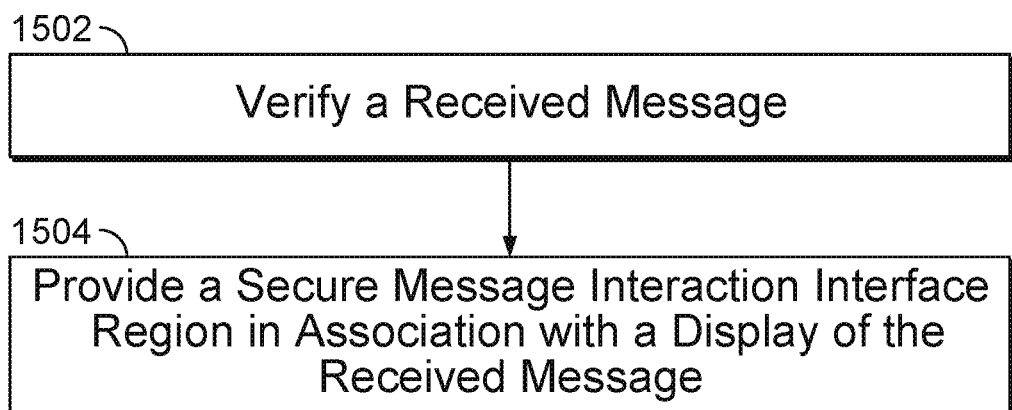
FIG. 15 is a flowchart illustrating an embodiment of a process for providing a secure message interaction interface region.

FIG. 15 is a flowchart illustrating an embodiment of a process for providing a secure message interaction interface region. The process of FIG. 15 may be at least in part implemented on analysis server 102, gateway 110, and/or message server 106 of FIG. 1. The detection of message forwarding may be helpful in the detecting of account take overs by a malicious attacker.

At 1502, a received message is verified. For example, it is determined in 504 of FIG. 5 that a sender of the message exactly matches a trusted contact, or in 508 of FIG. 5 it is determined that the sender of the message is not similar to a trusted contact. In some embodiments, the received message is verified as passing DMARC verification.

At 1504, a secure message interaction interface region is provided in association with a display of the received message to the recipient of the message. Often a message recipient may be tricked into performing unsafe actions instigated by a message that is a part of an impersonation attack. By providing on a message client (e.g., email client) or a user interface of a message service (e.g., web email interface) a special display region that can only display authorized information and/or actionable elements of messages that have been verified as authentic (e.g., pass DMARC verification), a user may be conditioned to utilize the special display region to perform actions or verify authenticity of a message for highly sensitive content/messages rather than relying on a body of a message that can be configured as desired by a malicious attacker.

For example, an email sender can include information relating to the actionable elements of the secure message interaction interface region in a message header, such as an X-header, where such headers are digitally signed before the message is transmitted. Alternatively, an online service can maintain an association between whitelisted senders and sources of actionable elements. In yet another implementation, the message may contain a purpose-specific MIME part, in which a list of elements to be displayed in the secure area and their metadata could be included within the body of the email message.

In some embodiments, the secure message interaction interface region (i.e., secure display area) includes a representation of the sender, such as a photo or a logo, where this representation has been vetted and associated with the sender upon registration of the sender in the system. The representation may be stored by a message service provider, requested from a third-party resource on demand, or attached to the message in a header or content portion, and digitally signed by the sender before transmission. In addition, the secure display area may also preferably comprise at least one actionable element, such as a link to a website or a handle associated with an attachment, allowing the user to access a resource associated with the actionable element. Information associated with such actionable elements may be included as part of the message, whether in the header or content portion or obtained from a source associated with the sender. In one embodiment, the material associated with the actionable element is stored by the message service provider and provided to two or more recipients who receive an email from the sender, where the message indicates that the stored actionable element should be displayed in the secure display area.

In some embodiments, at least some of the actionable elements are customized for one or more users. One example customization of actionable material is the selection of what actionable elements are made available to one user, as opposed to another. For example, one user may be provided actionable elements corresponding to (1) a hyperlink to a checking account, (2) a hyperlink to a mortgage account, and (3) a link associated with a secure message sent to the user; whereas another user may be provided actionable elements corresponding to (1) a hyperlink to a savings account, (2) a late credit card bill payment alert, and (3) a request to verify whether a credit card was used in a specified location for a specified purchase. Some types of actionable material are static, such as a link to a savings account, whereas other types are dynamically generated as the secure display area is rendered. For example, a user receiving a message that is associated with a secure display area that comprises a request to verify whether a credit card was used in a specified location for a specified purchase— and who verifies this transaction—can then come back to view the secure display area, at which time the request to verify the transaction is not included as an actionable element.

For example, a sender may send a message to a customer, requesting the user to accept new terms of service, but by the time the user reads the message and displays the secure messaging area, there is an account alert for the user, warning the user of recent activity. The user would be provided an actionable element relating to this warning. This may be made possible by a real-time lookup of actionable elements at the time of rendering of the secure display area. A second example form of customization relates to the content of the actionable elements. For example, these may comprise deep links allowing a user to access his or her account directly, if it is determined that he or she is already authenticated on the device displaying the secure display area; or that leads to a login portal otherwise, where after positive authentication, the user is sent to a customized location.

In addition to providing convenient and potentially real-time actionable items in the secure display area (e.g., the activation or use of which would typically entail the user being directed away from the email service or chrome of the email provider), another way to make the secure display area useful for message recipients to regularly reference and use is to use it to display information of interest to the recipient, such as an account balance or package delivery date for a package in transit shipped by the sender of the authenticated message.

The use of customization may provide both convenience benefits and security benefits to users, and the placement of the actionable elements in the secure display area provides security since it conditions users only to act on elements that have been verified to be associated with trusted senders. An important idea in this context is that by making access to sender-associated resources of interest to the recipient (e.g., pointed to by the links displayed in the secure area) more convenient (e.g., through use of the MUA chrome-based secure display area either conveniently located visually for the end user and/or capable of displaying customized near-real-time content of interest to the recipient), message recipients are more likely to use it and rely upon it. With convenient and increasingly frequent interactions made secure, overall safety and protection against fraud is improved.

In some embodiments, the list of actionable items to be displayed in the secure display area is generated through a function which combines both real-time actionable items fetched from a system specified by the authenticated sender with the static actionable items carried within the email message (e.g., display-time actions and message send-time actions, known at the time the message is composed and sent). In some embodiments, information pulled in real-time from the sender's systems, such as a recipient's checking account balance, in the case of the sender being a bank, is included in the secure display area. To facilitate this, the recipient's account number (or a one-time use, limited-duration, or one-function-only identifier that maps to the recipient's account to allow a fetch of the current balance but nothing else) may be included in the message via a header or inclusion in the body. Imposters would not be able to include a working cryptographic nonce nor would their email pass the authentication tests required for the rendering of the secured display area. In some embodiments, in conjunction with the MUA operator (e.g., email provider) and the sender, certain compelling offers are provided in the secure display area, some of which could be made exclusive to the secure display area. In some embodiments, in the situation where a message is from a logistics/shipper, includes a tracking number, and is verified to be authentic, the secure display area shows package tracking information (e.g., location, timing, anticipated delivery time, etc.). Furthermore, in situations where a message's sender cannot be verified and/or there is reason to believe its contents are not trustworthy, the operator of the mail user agent can intentionally disable any actionable links present within the message body.

In some embodiments, the rendering of the secure display area is conditional on the email passing at least one security test, and in one embodiment conditional on a user action, such as clicking on or mousing over a location or element associated with the rendering of the secure display area. This location could, for example, be the sender email address or an icon displayed in the chrome of the message.

Alternatively, if the message is the sole message being displayed in full (e.g., not a view of a user's mailbox in which a summary is shown for multiple messages at once), the secure display area could be shown immediately beneath the message's header information (e.g., the "To," "From," date, and subject fields). The benefit may be that no user action is required to cause it to be displayed. In this situation, the secure area could contain a message to the effect of "no secure actions were found" if the message failed authentication tests. This would represent an additional signal to the recipient that the message may not be trustworthy.

Figure 16A:
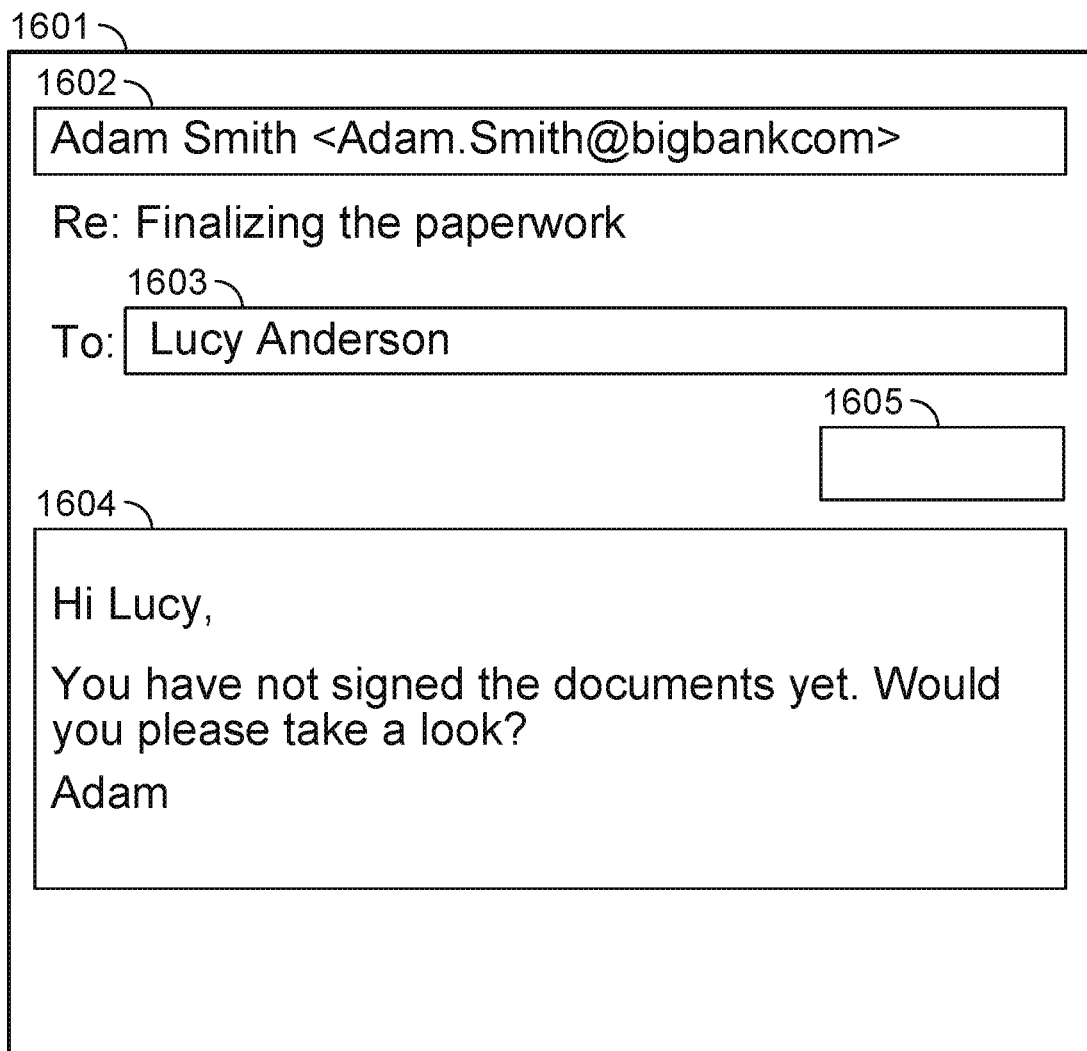
FIG. 16A shows example components of a message and FIG. 16B shows a secure display area of the message.
Figure 16B:
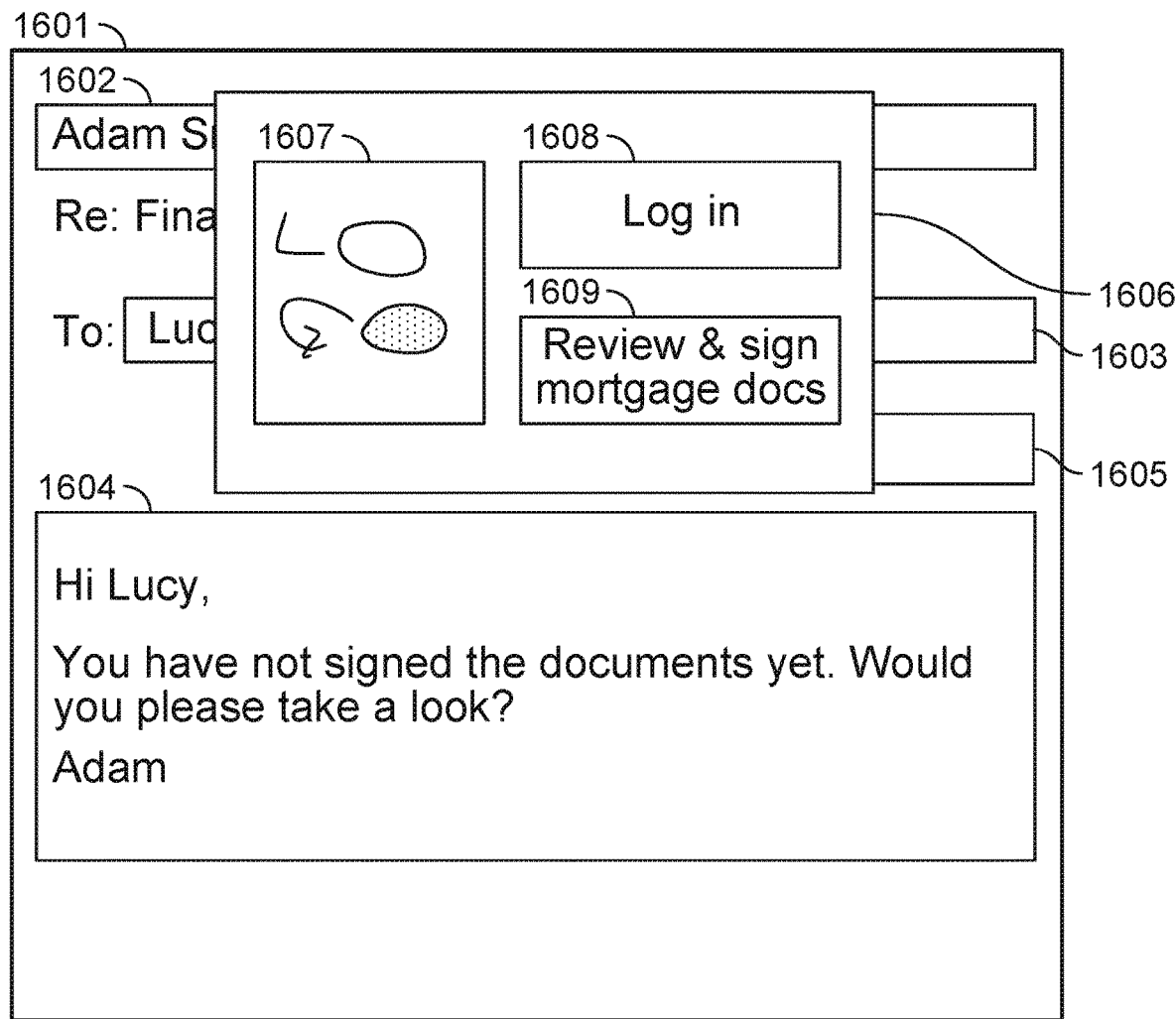

FIG. 16A shows example components of a message and FIG. 16B shows a secure display area of the message. Text and content of the message are not shown to simplify the example and illustrate the embodiment clearly. Email 1601 includes a displayed from field 1602, a displayed to field 1603, a displayed content field 1604, and an optional security indicator 1605 that is not displayed, and which in one embodiment comprises a digital signature on at least portions of the email 1601. Examples of optional security indicator 1605 include information associated with where the email was sent from, such as the IP address, the sending server, the path of transmission, or header information relating to the carrier used by the sender or the computer device used by the sender. As a result of the recipient of the email 1601 interacting with a portion of the email, such as from field 1602, a secure display area is generated and rendered as shown in FIG. 16B. Secure display area 1606 is generated and rendered in response to the user action taken by the recipient of email 1601. Secure display area 1606 comprises a representation image of the sender 1607, an actionable element 1608, and an actionable element 1609. Examples of the actions performed by selecting actionable elements 1608 or 1609 include selection of hyperlink(s), opening of attachment(s), initialization of secure user messaging, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method for securing a message, comprising:
performing a first risk analysis of the message, wherein performing the first risk analysis of the message includes determining whether sender information associated with the message matches information associated with a trusted contact;

in response to the first risk analysis resulting in a determination that the message meets a first criteria that indicates the sender information associated with the message does not match the information associated with the trusted contact and a similarity measure between the sender information associated with the message and the information associated with the trusted contact is greater than a similarity threshold value, performing operations comprising:
  modifying at least a portion of the message prior to sending a modified version of the message to a specified recipient of the message, wherein the modified version of the message at least includes data in a data field of the message that indicates an identification of a sender of the message, wherein the data in the data field of the message at least includes a warning; and
  performing a second risk analysis of the message including by:
    performing an automatic computer analysis of the message, wherein the automatic computer analysis of the message classifies the sender of the message;
    sending to the specified recipient a request to classify the sender of the message;
    receiving from the specified recipient a response to the request to classify the sender of the message; and
    matching a classification of the automatic computer analysis to the response to classify the sender of the message, wherein the first risk analysis is performed before sending the modified version of the message and the modified version of the message is sent to the specified recipient of the message prior to a conclusion of the second risk analysis; and
in response to matching the classification of the automatic computer analysis to the response to classify the sender of the message, providing to the specified recipient of the message, content of the message that was previously prevented from being accessed by the specified recipient,
wherein performing the first risk analysis or the second risk analysis of the message includes:
  sending to the sender of the message a reply message requesting the sender to provide an evidence of validity of the sender and the evidence of validity of the sender includes a proof of access to an alternate email message account; and
  detecting that a threshold number of messages have been forwarded to an external message account by the sender of the message and requesting a verification from the sender that the external message account is the alternate email message account of the sender.

2. The method of claim 1, wherein modifying at least the portion of the message includes redacting at least the portion of the message.

3. The method of claim 1, wherein modifying at least the portion of the message includes modifying an identifier of the sender of the message.

4. The method of claim 1, wherein performing the first risk analysis of the message includes analyzing a sender identifier included in the message.

5. The method of claim 1, wherein modifying at least the portion of the message includes inserting in the message a user inquiry associated with a verification of the sender of the message, and the user inquiry requests a user response.

6. The method of claim 1, wherein modifying at least the portion of the message includes modifying the message to include a list of hyperlinked options associated with possible classification selection options of the sender of the message.

7. The method of claim 1, wherein classifying the sender of the message includes determining whether the sender of the message has previously communicated with the specified recipient of the message a threshold number of times.

8. The method of claim 1, wherein performing the second risk analysis of the message includes determining whether the sender of the message shares a same network domain with the specified recipient of the message.

9. The method of claim 1, wherein performing the first risk analysis or the second risk analysis of the message includes sending to the sender of the message the reply message requesting the sender verify that the sender sent the message.

10. The method of claim 1, further comprising, providing in a secure message interaction interface region associated with the message, an actionable element indicated in a header of the message and the actionable element is able to be selected by a user to perform an associated action.

11. The method of claim 1, further comprising, configuring a rule filter that detects when a new message is forwarded and subsequently deleted from a message account.

12. The method of claim 1, further comprising receiving a new message to be sent and adding a unique subdomain to a sender address of the new message prior to sending the new message.

13. The method of claim 1, further comprising tracking a baseline message traffic measure for each message sending entity for at least messages received by a same recipient and detecting a message bomb attack using the baseline message traffic measures.

14. A system for securing a message, comprising:
a processor configured to:
  perform a first risk analysis of the message, wherein performing the first risk analysis of the message includes determining whether sender information associated with the message matches information associated with a trusted contact;
  in response to the first risk analysis resulting in a determination that the message meets a first criteria that indicates the sender information associated with the message does not match the information associated with the trusted contact and a similarity measure between the sender information associated with the message and the information associated with the trusted contact is greater than a similarity threshold value, the processor is further configured to:
    modify at least a portion of the message prior to sending a modified version of the message to a specified recipient of the message, wherein the modified version of the message at least includes data in a data field of the message that indicates an identification of a sender of the message, wherein the data in the data field of the message at least includes a warning; and
    perform a second risk analysis of the message including by:
      performing an automatic computer analysis of the message, wherein the automatic computer analysis of the message classifies the sender of the message;

sending to the specified recipient a request to classify the sender of the message;

receiving from the specified recipient a response to the request to classify the sender of the message; and matching a classification of the automatic computer analysis to the response to classify the sender of the message, wherein the first risk analysis is performed before sending the modified version of the message and the modified version of the message is sent to the specified recipient of the message prior to a conclusion of the second risk analysis; and in response to matching the classification of the automatic computer analysis to the response to classify the sender of the message, provide to the specified recipient of the message, content of the message that was previously prevented from being accessed by the specified recipient, wherein to perform the first risk analysis or the second risk analysis of the message, the processor is configured to:

send to the sender of the message a reply message requesting the sender to provide an evidence of validity of the sender and the evidence of validity of the sender includes a proof of access to an alternate email message account; and detect that a threshold number of messages have been forwarded to an external message account by the sender of the message and requesting a verification from the sender that the external message account is the alternate email message account of the sender; and a memory coupled to the processor and configured to provide the processor with instructions.

\* \* \* \* \*